US009976804B2

(12) United States Patent
Hanawa et al.

(10) Patent No.: US 9,976,804 B2
(45) Date of Patent: May 22, 2018

(54) VAPOR SUPPLYING APPARATUS, VAPOR DRYING APPARATUS, VAPOR SUPPLYING METHOD, AND VAPOR DRYING METHOD

(71) Applicant: SCREEN Holdings Co., Ltd., Kyoto (JP)

(72) Inventors: Yosuke Hanawa, Kyoto (JP); Katsuhiko Miya, Kyoto (JP)

(73) Assignee: SCREEN Holdings Co., Ltd. (JP)

( * ) Notice: Subject to any disclaimer, the term of this patent is extended or adjusted under 35 U.S.C. 154(b) by 0 days. days.

(21) Appl. No.: 15/000,532

(22) Filed: Jan. 19, 2016

(65) Prior Publication Data
US 2016/0243461 A1 Aug. 25, 2016

(30) Foreign Application Priority Data
Feb. 23, 2015 (JP) .................................. 2015-032397

(51) Int. Cl.
| | | |
|---|---|---|
| *F26B 5/00* | (2006.01) | |
| *B01D 53/26* | (2006.01) | |
| *F26B 21/14* | (2006.01) | |

(52) U.S. Cl.
CPC .............. *F26B 5/00* (2013.01); *B01D 53/263* (2013.01); *B01D 53/265* (2013.01); *B01D 53/268* (2013.01); *F26B 21/145* (2013.01); *B01D 2256/24* (2013.01)

(58) Field of Classification Search
CPC ........ F26B 5/00; F26B 21/145; B01D 53/263; B01D 53/265; B01D 53/268; B01D 2256/24
USPC .................................. 34/74, 381; 134/19, 30
See application file for complete search history.

(56) References Cited

U.S. PATENT DOCUMENTS

| | | | | |
|---|---|---|---|---|
| 5,105,556 A | * | 4/1992 | Kurokawa | ................ F26B 3/00 |
| | | | | 134/11 |
| 5,243,768 A | | 9/1993 | Fukao et al. | ....................... 34/22 |
| 5,249,371 A | | 10/1993 | Saito et al. | ....................... 34/78 |
| 5,608,974 A | * | 3/1997 | Tanaka | ..................... F26B 5/04 |
| | | | | 118/58 |

(Continued)

FOREIGN PATENT DOCUMENTS

| | | |
|---|---|---|
| JP | H04-155924 | 5/1992 |
| JP | H05-90240 | 4/1993 |

(Continued)

OTHER PUBLICATIONS

Office Action/Search Report dated Apr. 14, 2017 in counterpart Taiwanese Patent Application No. 105101710.

(Continued)

*Primary Examiner* — Stephen M Gravini
(74) *Attorney, Agent, or Firm* — Ostrolenk Faber LLP

(57) ABSTRACT

When a substrate on which a fine pattern is formed is dried with vapor, prevention of collapse of the pattern due to water originally contained in IPA to be stored has been a problem to be solved. A mixed liquid stored in a mixed liquid storage is vaporized to generate mixed vapor containing the IPA and water (water vapor). Then, a vapor dewatering unit connected to a vapor supply pipe through which the mixed vapor is fed removes water in the mixed vapor. This can reduce the concentration of water originally contained in the IPA to be stored before the IPA is supplied to the substrate, thereby suppressing collapse of the pattern.

14 Claims, 8 Drawing Sheets

(56) References Cited

U.S. PATENT DOCUMENTS

| | | | | |
|---|---|---|---|---|
| 5,950,328 | A * | 9/1999 | Ichiko | H01L 21/67034 34/364 |
| 6,032,382 | A * | 3/2000 | Matsumoto | H01L 21/67034 257/E21.228 |
| 6,108,932 | A * | 8/2000 | Chai | H01L 21/67034 34/245 |
| 6,128,830 | A * | 10/2000 | Bettcher | H01L 21/67034 134/2 |
| 6,134,807 | A * | 10/2000 | Komino | H01L 21/67034 34/418 |
| 7,437,834 | B2 * | 10/2008 | Nakatsukasa | H01L 21/02052 34/381 |
| 7,644,512 | B1 * | 1/2010 | Liu | C11D 11/0041 118/65 |
| 7,648,580 | B2 * | 1/2010 | Nakatsukasa | H01L 21/67028 134/1 |
| 8,056,257 | B2 * | 11/2011 | Ohno | H01L 21/02052 34/218 |
| 2003/0102017 | A1 | 6/2003 | Taniyama | 134/100.1 |
| 2006/0183240 | A1 | 8/2006 | Taniyama | 436/151 |
| 2007/0006483 | A1 | 1/2007 | Kamikawa et al. | 34/467 |
| 2008/0093340 | A1 | 4/2008 | Nakamori et al. | 216/57 |
| 2008/0190454 | A1 | 8/2008 | Eitoku | 134/19 |
| 2012/0260517 | A1 | 10/2012 | Lenz et al. | 34/357 |
| 2014/0290090 | A1 * | 10/2014 | Campion | F26B 20/00 34/381 |

FOREIGN PATENT DOCUMENTS

| | | |
|---|---|---|
| JP | 2752001 B2 | 5/1998 |
| JP | 2003-168668 | 6/2003 |
| JP | 2005-167089 A | 6/2005 |
| JP | 2007-046838 | 2/2007 |
| JP | 2008-112971 | 5/2008 |
| JP | 2008-198741 | 8/2008 |
| JP | 2013-023440 | 2/2013 |
| TW | 200714843 A | 4/2007 |
| TW | 200847249 A | 12/2008 |
| TW | 201308476 A1 | 2/2013 |

OTHER PUBLICATIONS

Notice of Allowance dated Oct. 12, 2017 in corresponding Korean Patent Application No. 10-2016-0011638.

* cited by examiner

VAPOR SUPPLYING APPARATUS, VAPOR DRYING APPARATUS, VAPOR SUPPLYING METHOD, AND VAPOR DRYING METHOD

BACKGROUND OF THE INVENTION

Field of the Invention

The present invention relates to a vapor drying apparatus for a substrate, a vapor drying method for a substrate, and a vapor supplying apparatus and a vapor supplying method used for vapor drying process on a substrate. The substrate mentioned herein includes various types of substrates such as a semiconductor wafer, a glass substrate for a photomask, a glass substrate for a liquid crystal display, a glass substrate for a plasma display, a substrate for an field emission display (FED), a substrate for an optical disk, a substrate for a magnetic disk, and a substrate for a photoelectromagnetic disk.

Description of the Background Art

In a step of manufacturing an electronic component such as a semiconductor device or a liquid crystal display device, a substrate such as a semiconductor wafer or a glass substrate for a liquid crystal display device is subjected to process using processing liquid. More specifically, a main surface of the substrate is cleaned or etched by being subjected to wet process with a chemical liquid. Then, pure water such as de-ionized water (hereinafter called "DIW") is supplied to the main surface of the substrate having received the chemical liquid to perform rinsing process of washing off the chemical liquid from the main surface of the substrate.

After the rinsing process, drying process is performed to remove the pure water remaining on the main surface of the substrate to dry the substrate. For example, a conventionally employed method for this drying process includes a spin-drying method of shaking off and removing the pure water using centrifugal force resulting from rotation of the substrate and a blow-drying method of blowing off or evaporating the pure water on the main surface of the substrate and removing the pure water by blowing nitrogen gas on the main surface of the substrate.

However, the aforementioned drying methods cause the risk of pattern collapse if a pattern made of fine projections and depressions is formed on the main surface of the substrate. The pattern collapse is caused by the surface tension of the pure water left unremoved in a place inside the pattern such as a depression of the pattern as the pattern on the main surface of the substrate is exposed from the surface of the pure water in response to progress of the drying. Prevention of the pattern collapse has become an important problem to be solved particularly in recent years where a pattern on the main surface of the substrate has become finer and finer.

According to one technique, liquid or vapor of isopropyl alcohol (hereinafter called "IPA"), which is an organic solvent of lower surface tension than pure water, is supplied to a main surface of a substrate after being subjected to ringing process to replace pure water adhering to the main surface of the substrate with the IPA. Then, the substrate is dried by removing the IPA from the main surface of the substrate.

A technique of drying a substrate by supplying vapor of IPA to a main surface of a substrate to replace pure water adhering to a main surface of a substrate with the IPA and then removing the IPA from the main surface of the substrate is described in Japanese Patent Application Laid-Open Nos. 4-155924 (1992) and 2008-198741.

The following describes known methods of generating vapor of IPA. The method of Japanese Patent Application Laid-Open No. 2003-168668 employs a bubbling system of generating a mixed gas containing IPA vapor by bubbling an N2 gas through IPA stored in an IPA tank. The method of Japanese Patent Application Laid-Open No. 2007-46838 employs a two-fluid nozzle system of generating IPA vapor by generating a mixed fluid of an IPA liquid and an N2 gas using a two-fluid nozzle and then by heating the mixed fluid. The method of Japanese Patent Application Laid-Open No. 5-90240 (1993) employs a liquid heating system of evaporating IPA in a liquid state stored in a tank by heating the IPA with a heater block.

Japanese Patent Application Laid-Open No. 2013-23440 discloses a technique of recycling waste IPA having been used in a step of manufacturing a semiconductor device by collecting the waste IPA and purifying the collected IPA to a level comparable to the level of the IPA having been purchased in preparation for the step of manufacturing the semiconductor device. According to the technique disclosed in Japanese Patent Application Laid-Open No. 2013-23440, the collected IPA is subjected to ion-exchange process of removing an ion component in the IPA using an ion-exchange resin, dewatering process using a pervaporation membrane, and distilling process performed sequentially. Then, the aforementioned purifying process is performed on the waste IPA in a circulation line until an alcohol concentration in the IPA becomes a certain level or more. The purified IPA is thereafter supplied to a supply tank.

As described above, in a step of manufacturing a semiconductor device, prevention of pattern collapse resulting from the surface tension of water left unremoved inside a pattern on a main surface of a substrate is a problem to be solved while the substrate is dried. This problem has conventionally been solved by replacing the water inside the pattern with a substance of low surface tension such as IPA. However, under the influence of water contained in IPA itself to be supplied to the main surface of the substrate, water still remains on the main surface of the substrate even after the replacement with the IPA. This makes pattern collapse uncontrollable in recent years where a pattern has become finer and finer.

More specifically, if water remains on the main surface of the substrate, the water is filled in a gap between pattern elements formed on the main surface of the substrate. If the filled water reaches a height sufficient to exert surface tension relative to the height of a projection of the pattern, the surface tension of the water in the gap between the pattern elements acts on the pattern as this water is vaporized, causing collapse of the pattern. The volume of the gap between the pattern elements is reduced with increase in the fineness of the pattern. Thus, even if the water in a tiny amount remains on the main surface of the substrate, the water is still filled in the gap between the pattern elements to a height sufficient to exert surface tension.

Thus, for prevention of pattern collapse, the amount of water remaining on the main surface of the substrate should be reduced further in response to increase in the fineness of the pattern.

Referring to Japanese Patent Application Laid-Open No. 2013-23440, for example, a circulation line for dewatering is provided in a line of collecting IPA after being used for substrate processing. Thus, in Japanese Patent Application Laid-Open No. 2013-23440, water originally contained in IPA charged as refill alcohol in a supply tank cannot be removed from this IPA, thereby causing the risk of pattern collapse due to this water.

According to a technique disclosed in Japanese Patent Application Laid-Open No. 2008-112971, for example, while processing space in a chamber where a wafer is to be processed is filled with clean dried air (CDA), an IPA liquid is supplied to a wafer to replace pure water on the upper surface of the wafer with the IPA, thereby suppressing mixture of water into the IPA liquid supplied to the surface of the wafer.

In some cases, however, water in large amount is contained in IPA in a stage before being supplied to a substrate, specifically, in the IPA in a liquid state stored in a tank waiting to be supplied from a nozzle to the substrate. In these cases, the large amount of water is already contained in generated vapor of the IPA. Thus, drying the substrate by blowing this vapor on the substrate causes pattern collapse due to the water.

As a result of the high hygroscopicity of IPA, while IPA is brought in and poured into a tank or while the IPA is stored in the tank, the IPA contacts external air containing moisture and absorbs the moisture. In this case, a water concentration in the IPA might be increased to a predetermined concentration value or more before the IPA is used for substrate processing.

Even if the aforementioned absorption of moisture is substantially unlikely during incoming transport of IPA, for example, the risk of pattern collapse is still caused due to water originally contained in the IPA at the time of its purchase in recent years where a pattern has become finer and finer.

Commercially-available IPA is classified into grades in a manner that depends on an intended purpose of use, for example. Values relating respectively to impurities such as water content are specified for each grade. For use in electronics industrial purposes such as a step of manufacturing a semiconductor device requiring IPA of higher purity, IPA of what is called "EL grade (high grade)" is used. The concentration of IPA at this grade is about 99.9% or more, although this concentration differs depending on respective specified values of manufactures. However, even IPA at the EL grade may still contain from about 0.01 to about 0.1% of water. Even water in such a tiny amount still causes a risk leading to pattern collapse.

SUMMARY OF THE INVENTION

It is an object of the present invention to provide a vapor supplying method and a vapor supplying apparatus that reduce a water content in IPA vapor to be supplied to a substrate to supply the IPA vapor of a high concentration to a processing chamber, and a vapor drying method and a vapor drying apparatus that perform drying process on the substrate with the IPA vapor supplied from the vapor supplying apparatus.

To solve the aforementioned problem, a first aspect of the present invention is intended for a vapor supplying apparatus used for vapor drying process of supplying vapor of a low surface tension liquid to a main surface of a substrate to which a processing liquid adheres. The low surface tension liquid has surface tension same as or lower than that of the processing liquid. The vapor supplying apparatus comprises: a mixed liquid storage that stores a mixed liquid containing the low surface tension liquid and water; a vapor generator that generates mixed vapor as vapor of the mixed liquid from the mixed liquid stored in the mixed liquid storage; a vapor supply pipe connected to the mixed liquid storage and through which the mixed vapor generated by the vapor generator is supplied to the substrate; and a vapor dewatering unit interposed in the vapor supply pipe. The vapor dewatering unit removes water from the mixed vapor passing through the vapor supply pipe.

A second aspect of the present invention is intended for a vapor supplying method used for vapor drying process of supplying vapor of a low surface tension liquid to a main surface of a substrate to which a processing liquid adheres. The low surface tension liquid has surface tension same as or lower than that of the processing liquid. The vapor supplying method comprises: a storing step of supplying a mixed liquid containing the low surface tension liquid and water to a mixed liquid storage that stores the mixed liquid; and a vapor supplying step of generating mixed vapor as vapor of the mixed liquid from the mixed liquid stored in the mixed liquid storage and supplying the mixed vapor to a vapor supply pipe connected to the mixed liquid storage and through which the mixed vapor is supplied to the substrate. The vapor supplying step includes a vapor dewatering step of removing water from the mixed vapor supplied to the vapor supply pipe.

A third aspect of the present invention is intended for a vapor drying method of supplying vapor of a low surface tension liquid to a main surface of a substrate to which a processing liquid adheres. The low surface tension liquid has surface tension same as or lower than that of the processing liquid. The vapor drying method comprises: a storing step of supplying a mixed liquid containing the low surface tension liquid and water to a mixed liquid storage that stores the mixed liquid; and a vapor supplying step of generating mixed vapor as vapor of the mixed liquid from the mixed liquid stored in the mixed liquid storage and supplying the mixed vapor through a vapor supply pipe connected to the mixed liquid storage to the main surface of the substrate to which the processing liquid adheres. The vapor supplying step includes a vapor dewatering step of removing water from the mixed vapor supplied to the vapor supply pipe.

According to the first to third aspects of the present invention, IPA vapor of a high concentration can be generated and supplied by reducing a water content in the IPA vapor to be supplied to a substrate.

According to the first to third aspects of the present invention, the substrate can be dried favorably by supplying the IPA vapor of the high concentration to the substrate and performing drying process on the substrate.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
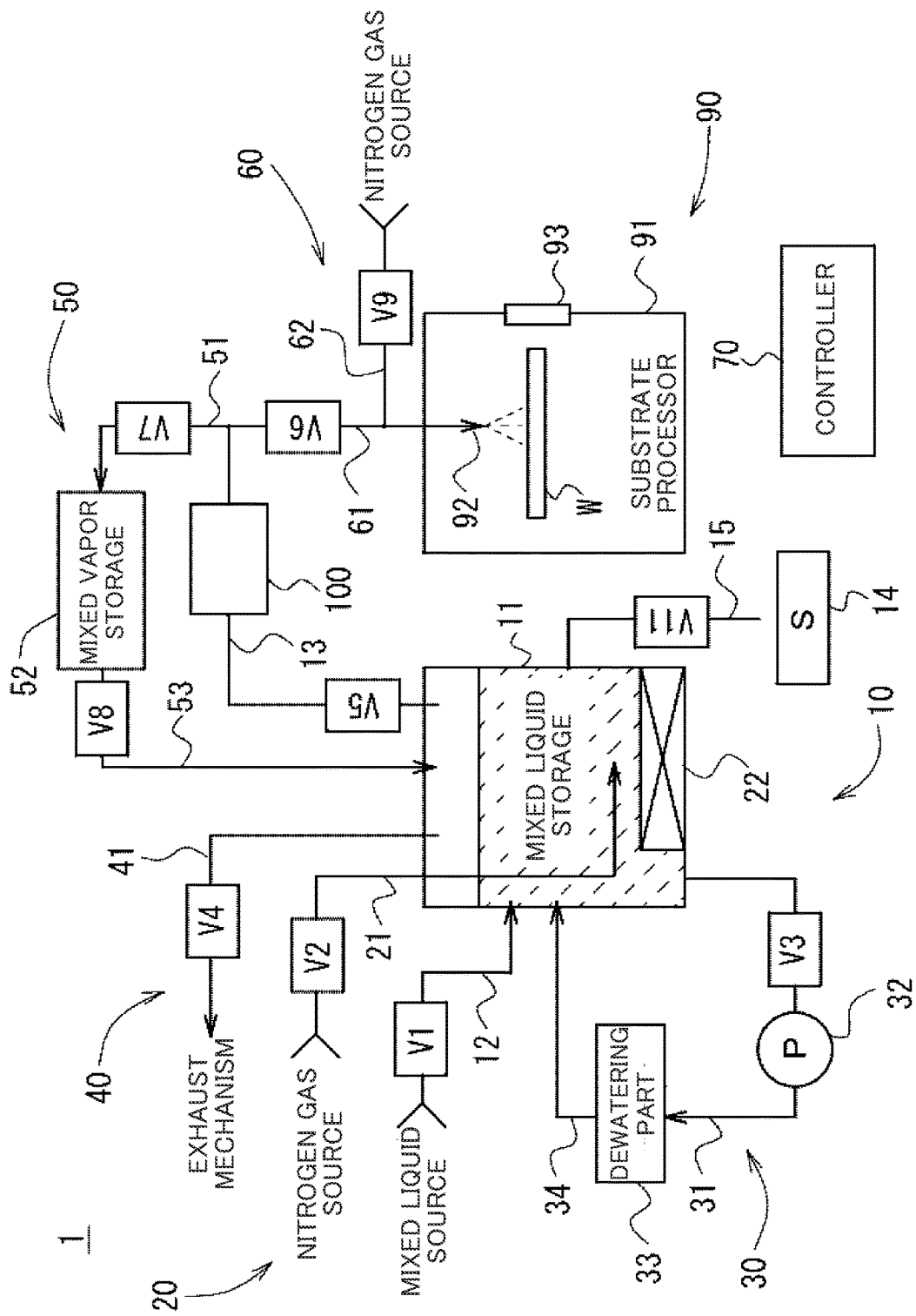
FIG. 1 is a schematic view showing an entire structure of a vapor drying apparatus according to a first preferred embodiment.

A substrate referred to in the following description means various types of substrates such as a semiconductor substrate, a glass substrate for a photomask, a glass substrate for a liquid crystal display, a glass substrate for a plasma display, a substrate for an field emission display (FED), a substrate for an optical disk, a substrate for a magnetic disk, and a substrate for a photoelectromagnetic disk.

A substrate used as an example in the following description is provided with a pattern such as a circuit pattern (hereinafter called a "pattern") formed only on one main surface of the substrate. One main surface on which the pattern is formed is called a "front surface" and an opposite main surface on which a pattern is not formed is called a "rear surface." A surface of the substrate facing downward is called a "lower surface" and a surface of the substrate facing upward is called an "upper surface." The following description proceeds on the assumption that the upper surface corresponds to the front surface (one main surface).

Preferred embodiments of the present invention are described below by referring to the drawings using a substrate processing apparatus for processing of a semiconductor substrate as an example. The present invention is applicable not only to processing of a semiconductor substrate but also to processing of various substrates such as a glass substrate for a liquid crystal display.

First Preferred Embodiment

<1-1. Structure of Apparatus>

FIG. 1 shows an outline of the structure of a vapor drying apparatus according to a first preferred embodiment. A vapor drying apparatus 1 is a single-wafer apparatus used for vapor drying process. In the vapor drying process, the vapor drying apparatus 1 supplies the substrate W such as a semiconductor substrate (hereinafter called a "substrate W" simply) with vapor of a low surface tension liquid lower in surface tension than a liquid such as DIW adhering to the substrate W with the intention of removing the adhesion liquid on the substrate W.

The low surface tension liquid to be used herein is an organic solvent such as IPA, hydrofluoroether (HFE), ethanol, or methanol. In the following description of the first preferred embodiment, IPA is used as the low surface tension liquid.

The low surface tension liquid is not limited to the aforementioned liquids. Instead of the aforementioned liquids, any liquid lower in surface tension and higher in volatility than DIW can be used as the low surface tension liquid.

The adhesion liquid on the substrate W is not limited to DIW. The adhesion liquid may be the same as a liquid to be selected as the low surface tension liquid, for example.

The vapor drying apparatus 1 includes a substrate processor 90 for drying process on the substrate W, a vapor supplying apparatus 10 that generates IPA vapor and supplies the IPA vapor to the substrate processor 90, and a controller 70 that controls the vapor drying apparatus 1. The controller 70 is electrically connected to each component of the vapor drying apparatus 1. The controller 70 gives a command to each component of the vapor drying apparatus 1 to control the vapor drying apparatus 1.

Figure 2:
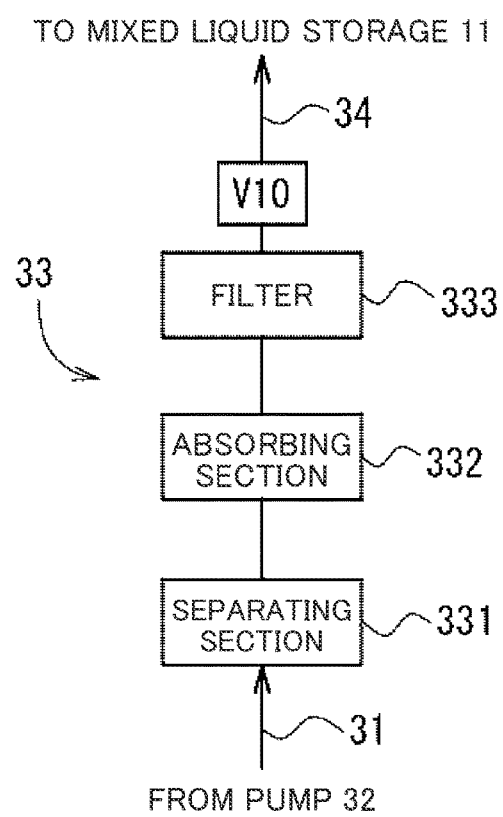
FIG. 2 is a schematic view showing the structure of a dewatering part according to the first preferred embodiment.
Figure 4:
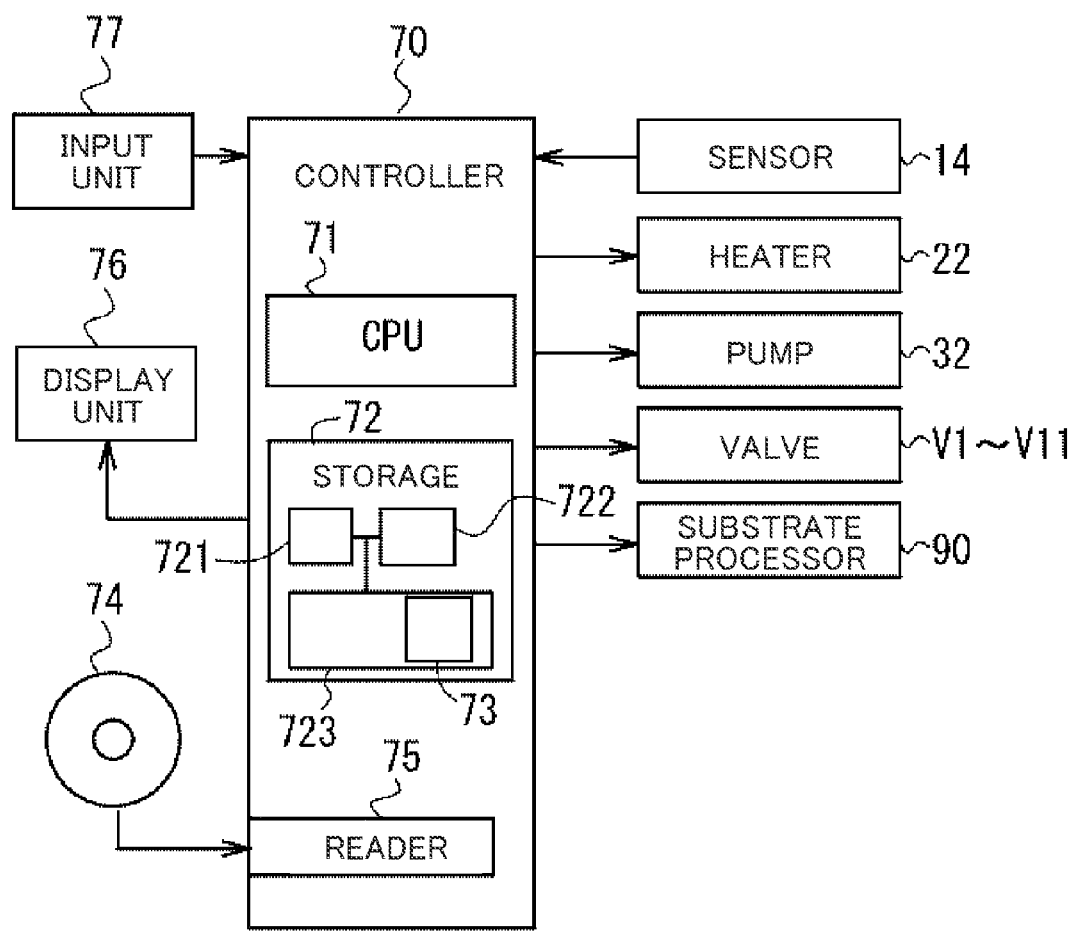
FIG. 4 is a schematic view showing the structure of a controller according to the first preferred embodiment.

FIG. 2 shows details of the structure of a dewatering part 33 of the vapor drying apparatus 1 described later. FIG. 4 is a block diagram showing a connection between the controller 70 and each component of the vapor drying apparatus 1. The structure of the vapor drying apparatus 1 is described below using FIGS. 1, 2, and 4 appropriately.

The vapor supplying apparatus 10 mainly includes a mixed liquid storage 11, a vapor supply pipe 13, a vapor generator 20, a circulation dewatering unit 30, an exhaust unit 40, and a mixed vapor supply 50. Each unit of the vapor supplying apparatus 10 is described in detail later.

The substrate processor 90 mainly includes a chamber 91 housing the substrate W, a nitrogen gas mixing unit 60 that mixes IPA vapor supplied from the vapor supplying apparatus 10 and a nitrogen gas, and a nozzle 92 from which the IPA vapor is blown on the substrate W. Each unit of the substrate processor 90 is described in detail later.

Each unit of the vapor supplying apparatus 10 is described next.

The vapor supplying apparatus 10 includes the mixed liquid storage 11, a pipe 12, and a valve V1. The mixed liquid storage 11 stores IPA in a liquid state containing water (hereinafter called a "mixed liquid"). The pipe 12 is used for supplying the mixed liquid to the mixed liquid storage 11 from a mixed liquid source. The valve V1 is interposed in the pipe 12 to be used for controlling communication between the mixed liquid source and the mixed liquid storage 11.

The valve V1 is electrically connected to the controller 70. The valve V1 is opened and closed in response to an operational command from the controller 70. If the valve V1 is opened in response to an operation command from the controller 70 to the valve V1, the mixed liquid is supplied from the mixed liquid source to the mixed liquid storage 11 through the pipe 12. If the valve V1 is closed in response to an operation command from the controller 70 to the valve V1, supply of the mixed liquid from the mixed liquid source to the mixed liquid storage 11 is stopped.

In the first preferred embodiment, the mixed liquid supplied from the mixed liquid source contains 0.1% by weight of water and 99.9% by weight of IPA. The mixed liquid source may be a tank provided in the vapor drying apparatus 1. Alternatively, the mixed liquid source may be a plant facility such as a large-size tank provided in a plant and outside the vapor drying apparatus 1 or a movable tank brought into the plant from outside.

The mixed liquid storage 11 is a tank that stores the mixed liquid. The mixed liquid storage 11 includes a liquid level sensor (not shown in the drawings) provided to sense the amount of the mixed liquid stored in the mixed liquid storage 11. The liquid level sensor is electrically connected to the controller 70. If a liquid level in the mixed liquid storage 11 is at a designated height or more, the liquid level sensor outputs a sensing signal to the controller 70.

Providing the liquid level sensor is not absolutely necessary in terms of implementing the present invention. Instead of providing the liquid level sensor, the tank may be provided with a window that allows an operator to know the amount of the mixed liquid stored in the mixed liquid storage 11.

The vapor supplying apparatus 10 further includes a sensor 14 that measures a water concentration in the mixed liquid stored in the mixed liquid storage 11. There are generally two types of sensors for measurement of a water concentration: an offline sensor and an inline sensor. The offline sensor is to measure a water concentration in a liquid actually taken out of a storage of the liquid. The inline sensor is to measure a water concentration in a liquid without taking out the liquid from a storage or a pipe line. The sensor 14 used in the first preferred embodiment is an offline sensor installed in an offline outside the mixed liquid storage 11. The sensor 14 is capable of measuring a water concentration on the order of parts per million (ppm), specifically, on the order of 0.0001%. A sensor used as the sensor 14 in the first preferred embodiment is a water measuring unit using Karl Fischer's method.

The sensor 14 is electrically connected to the controller 70 and outputs a water concentration measured by the sensor 14 as an electric signal to the controller 70. The electric signal input to the controller 70 is stored as data into a storage 72 described later. In this way, a water concentration in the mixed liquid storage 11 can be monitored using the sensor 14 and the controller 70.

As described above, a sensor that measures a water concentration is used as the sensor 14 in the first preferred embodiment. However, the sensor 14 is not limited to such measurement system in terms of implementing the present invention. The sensor 14 may be a sensor that measures an IPA concentration. Additionally, while an offline sensor is used as the sensor 14 in the first preferred embodiment, instead of the sensor 14, an inline sensor may also be used.

The vapor supplying apparatus 10 further includes a pipe 15 connected to the mixed liquid storage 11 and a valve V11 interposed in the pipe 15. The pipe 15 is a drain line through which the mixed liquid stored in the mixed liquid storage 11 is dripped in a desired amount onto the sensor 14. The pipe 15 has one end connected to the mixed liquid storage 11 and an opposite end that is an open end opened to allow dripping onto the sensor 14.

The valve V11 is electrically connected to the controller 70. The valve V11 is opened and closed in response to an operational command from the controller 70. If the valve V11 is opened in response to an operation command from the controller 70 to the valve V11, the mixed liquid inside the mixed liquid storage 11 travels through the pipe 15 toward the opposite end of the pipe 15. Then, the mixed liquid flows out (or dripped) from the opposite end as the open end of the pipe 15. If the valve V11 is closed in response to an operation command from the controller 70 to the valve V11, outflow of the mixed liquid from the open end of the pipe 15 is stopped.

Regarding supply of the mixed liquid to the sensor 14, the mixed liquid may be dripped directly from the open end of the pipe 15 onto the sensor 14. Alternatively, the mixed liquid flowing out from the open end may be poured into a different container, a drop of the mixed liquid may be transported to a pipette, and then the drop may be dripped from the pipette onto the sensor 14. In the first preferred embodiment, the mixed liquid is configured so as to be dripped directly from the open end of the pipe 15.

The vapor supplying apparatus 10 includes the vapor generator 20 that generates mixed vapor containing vapor of the mixed liquid from the mixed liquid stored in the mixed liquid storage 11.

The vapor generator 20 includes a pipe 21, a valve V2, and a heater 22. A nitrogen gas is supplied from a nitrogen gas source through the pipe 21 into the mixed liquid stored in the mixed liquid storage 11. The valve V2 is interposed in the pipe 21 to be used for controlling communication between the nitrogen gas source and the mixed liquid storage 11. The heater 22 heats the mixed liquid stored in the mixed liquid storage 11.

The valve V2 is electrically connected to the controller 70. The valve V2 is opened and closed in response to an operational command from the controller 70. If the valve V2 is opened in response to an operation command from the controller 70 to the valve V2, a nitrogen gas is supplied from the nitrogen gas source into the mixed liquid in the mixed liquid storage 11 through the pipe 21. If the valve V2 is closed in response to an operation command from the controller 70 to the valve V2, supply of the nitrogen gas from the nitrogen gas source to the mixed liquid storage 11 is stopped.

In the first preferred embodiment, a nitrogen gas supplied from the nitrogen gas source has a dew point controlled at −40° C. or less, preferably −80° C. or less by removing water from the nitrogen gas using drying means not shown in the drawings, for example. The nitrogen gas source may be a tank provided in the vapor drying apparatus 1. Alternatively, the nitrogen gas source may be a plant facility such as a large-size tank provided in a plant and outside the vapor drying apparatus 1 or a movable tank brought into the plant from outside.

As described above, the vapor generator 20 of the first preferred embodiment uses a nitrogen gas. However, a nitrogen gas is not the only gas used by the vapor generator 20 in terms of implementing the present invention. Instead of a nitrogen gas, the vapor generator 20 may supply an argon gas or clean dried air (CDA) containing 80% of nitrogen and 20% of oxygen and having a dew point of −40° C. or less.

The heater 22 is a publicly-known heater of a resistance heating system. The heater 22 is electrically connected to the controller 70. The heater 22 heats the mixed liquid stored in the mixed liquid storage 11 in response to an operational command from the controller 70. The temperature of the heating is controlled in response to an operational command from the controller 70. The heater 22 is capable of heating the mixed liquid stored in the mixed liquid storage 11 to a temperature from ordinary temperatures at the lowest to about 100° C.

For generation of vapor of the mixed liquid by the vapor generator 20, in response to an operational command from the controller 70, the valve V2 is opened to supply a nitrogen gas into the mixed liquid and the heater 22 is operated to heat the mixed liquid stored in the mixed liquid storage 11 to an extent that does not cause boil of the mixed liquid.

More specifically, the heater 22 heats the mixed liquid to a temperature from about 50 to about 60° C. The boiling point of IPA is 82.6° C., that of pure water is 100° C., and that of the mixed liquid containing IPA and water is about 87° C. Thus, by heating the mixed liquid to a temperature from about 50 to about 60° C. as described above, the vapor pressure of the mixed liquid can be increased to the level of ordinary temperatures or more while the mixed liquid is not boiled. In this way, mixture of vapor of the mixed liquid into a nitrogen gas supplied from the nitrogen gas source can be facilitated, thereby generating a mixed gas where mixed vapor containing IPA vapor and water vapor is mixed with the nitrogen gas. In the below, the IPA vapor and the water vapor contained in the mixed gas is called "mixed vapor."

In the first preferred embodiment, the bubbling system and the liquid heating system are used in combination as a method of generating the mixed vapor.

The method using the aforementioned systems is not the only method of generating the mixed vapor in terms of implementing the present invention. In the present invention, a two-fluid nozzle system may be used. Alternatively, the bubbling system and the liquid heating system may each be used alone instead of being used in combination. As described above, in the first preferred embodiment, the heater 22 heats the mixed liquid to a temperature lower than its boiling point to facilitate vaporization of the mixed liquid. However, this is not the only heating of the mixed liquid in terms of implementing the present invention. Vaporization of the mixed liquid may be facilitated by heating the mixed liquid to the boiling point or more.

The vapor supplying apparatus 10 includes the circulation dewatering unit 30. The circulation dewatering unit 30 introduces the mixed liquid stored in the mixed liquid storage 11 into the circulation dewatering unit 30 and removes water from the introduced mixed liquid, specifically, dewaters the mixed liquid. Then, the circulation dewatering unit 30 returns the dewatered mixed liquid to the mixed liquid storage 11.

The circulation dewatering unit 30 includes a pipe 31, a valve V3, a pump 32, the dewatering part 33, and a pipe 34. The dewatering part 33 is to remove water from the mixed liquid. The dewatering part 33 is described in detail later.

The pipe 31 connects the mixed liquid storage 11 and a separating section 331 of the dewatering part 33 described later to introduce the mixed liquid stored in the mixed liquid storage 11 into the dewatering part 33. The valve V3 and the pump 32 are interposed in the pipe 31. The pipe 34 connects the dewatering part 33 and the mixed liquid storage 11. The pipe 34 is provided separately from the pipe 31. The pipe 34 lets the mixed liquid having passed through the dewatering part 33 and having been subjected to dewatering process by the dewatering part 33 return to the mixed liquid storage 11.

The valve V3 is electrically connected to the controller 70. The valve V3 is opened and closed in response to an operational command from the controller 70. The pump 32 is electrically connected to the controller 70. The pump 32 feeds liquid in the pipe 31 from the direction of the valve V3 toward the direction of the dewatering part 33 in response to an operational command from the controller 70. If the pump 32 starts to operate and the valve V3 is opened in response to an operational command from the controller 70 to the pump 32 and the valve V3, the mixed liquid is supplied from the mixed liquid storage 11 to the dewatering part 33 through the pipe 31. Further, the mixed liquid having passed through the dewatering part 33 and having been subjected to the dewatering process by the dewatering part 33 is supplied to the mixed liquid storage 11 through the pipe 34.

If the pump 32 stops operation and the valve V3 is closed in response to an operational command from the controller 70 to the pump 32 and the valve V3, supply of the mixed liquid from the mixed liquid storage 11 to the dewatering part 33 through the pipe 31 and supply of the mixed liquid from the dewatering part 33 to the mixed liquid storage 11 through the pipe 34 are stopped.

The dewatering part 33 of the circulation dewatering unit 30 is described next using FIG. 2. FIG. 2 is a schematic view showing the structure of the dewatering part 33.

The dewatering part 33 includes the separating section 331, an absorbing section 332, and a filter 333. The separating section 331 is directly connected to the pipe 311. The absorbing section 332 is provided at a stage subsequent to the separating section 331 as viewed from the pump 32. The filter 333 is provided at a stage subsequent to the absorbing section 332 as viewed from the pump 32.

The dewatering part 33 further includes a valve V10. The valve V10 is interposed in the pipe 34 and provided between the mixed liquid storage 11 and the filter 333. The valve V10 controls communication between the mixed liquid storage 11 and the filter 333. The valve V10 is provided with the intention of preventing the mixed liquid from flowing backward from the mixed liquid storage 11 toward the dewatering part 33 through the pipe 34.

A member to be provided in the position of the valve V10 is not limited to a valve in terms of implementing the present invention. A check valve may be interposed in the pipe 34 instead of the valve V10.

The separating section 331 is formed of a separation membrane that separates IPA and water in the mixed liquid. The separating section 331 separates water in the mixed liquid as a target of separation from IPA using a pervaporation (PV) method. A zeolite membrane, a polyimide-based membrane, or a cellulose-based membrane can be used as the separation membrane. In the first preferred embodiment, a zeolite membrane widely used as a separation membrane for dewatering of alcohol and having considerably high hygroscopicity is used as the separation membrane of the separating section 331.

The absorbing section 332 is formed of an absorbing member that absorbs water in the mixed liquid. The absorbing section 332 absorbs water in the mixed liquid to remove the water from the mixed liquid selectively using the hygroscopicity of the absorbing member. In this way, the concentration of IPA in the mixed liquid is increased. In the first preferred embodiment, zeolite is used as a material for the absorbing member. However, a material for the absorbing member is not limited to zeolite in terms of implementing the present invention. Any material that selectively absorbs water in alcohol is usable as the absorbing member.

The filter 333 is formed of a porous filter element. The filter 333 is used to remove an impurity particle (such as a zeolite piece) resulting from passing the mixed liquid through the separating section 331 and the absorbing section 332. A glass fiber filter, a membrane filter, or a publicly-known filter for solvents can be used as the filter element. In the first preferred embodiment, a membrane filter having resistance to organic solvents and widely used in a semiconductor cleaning step is used as the filter element.

Referring back to FIG. 1, the vapor supplying apparatus 10 includes the exhaust unit 40. The exhaust unit 40 emits the mixed vapor generated in the mixed liquid storage 11 by the vapor generator 20 to an exhaust mechanism.

The exhaust unit 40 includes a pipe 41 and a valve V4. The pipe 41 connects the mixed liquid storage 11 and the exhaust mechanism. The valve V4 is interposed in the pipe 41 and controls communication between the mixed liquid storage 11 and the exhaust mechanism.

The valve V4 is electrically connected to the controller 70. The valve V4 is opened and closed in response to an operational command from the controller 70. If the valve V4 is opened in response to an operation command from the controller 70 to the valve V4, the mixed vapor is emitted from the mixed liquid storage 11 to the exhaust mechanism through the pipe 41. If the valve V4 is closed in response to an operation command from the controller 70 to the valve V4, emission of the mixed vapor from the mixed liquid storage 11 to the exhaust mechanism is stopped.

A pump may be interposed further in the pipe 41 to emit the mixed vapor positively.

The exhaust mechanism may be a tank provided inside the vapor drying apparatus 1 and outside the mixed liquid storage 11 that stores the mixed vapor emitted from the mixed liquid storage 11 through the pipe 41 as it is or stores the mixed vapor in a liquid state generated by publicly-known liquefying process on the mixed vapor. Alternatively, the exhaust mechanism may be a plant facility such as a large-size tank provided in a plant and outside the vapor drying apparatus 1 or a movable tank that can be taken out of the plant. The mixed vapor stored in such a tank is disposed of inside or outside the plant or recycled after being subjected to publicly-known IPA purifying process.

The vapor supplying apparatus 10 includes the vapor supply pipe 13, a valve V5, and a vapor dewatering unit 100. The vapor supply pipe 13 connects the mixed liquid storage 11 and a pipe 61 of the substrate processor 90. The valve V5 is interposed in the vapor supply pipe 13 and controls communication between the mixed liquid storage 11 and the pipe 61. The vapor dewatering unit 100 is interposed in the vapor supply pipe 13 and removes water from the mixed vapor passing through the vapor supply pipe 13.

The mixed vapor generated in the mixed liquid storage 11 by the vapor generator 20 is passed through the vapor supply pipe 13 and dewatered by the vapor dewatering unit 100. Then, the resultant mixed vapor is supplied to the substrate processor 90 or a mixed vapor storage 52 described later.

The valve V5 is electrically connected to the controller 70. The valve V5 is opened and closed in response to an operational command from the controller 70. If the valve V5 is opened in response to an operation command from the controller 70 to the valve V5, the mixed liquid storage 11 is connected to a pipe 51 described later or to the pipe 61 of the substrate processor 90.

If the valve V5 is opened and a valve V6 described later is also opened, the mixed liquid storage 11 and the nozzle 92 of the substrate processor 90 are connected through the vapor supply pipe 13 and the pipe 61. If the valve V5 is opened and a valve V7 described later is also opened, the mixed liquid storage 11 and the mixed vapor storage 52 are connected through the vapor supply pipe 13 and the pipe 51.

If the valve V5 is closed in response to an operation command from the controller 70 to the valve V5, the connection of the mixed liquid storage 11 to the pipe 51 or 61 is cut.

Figure 3:
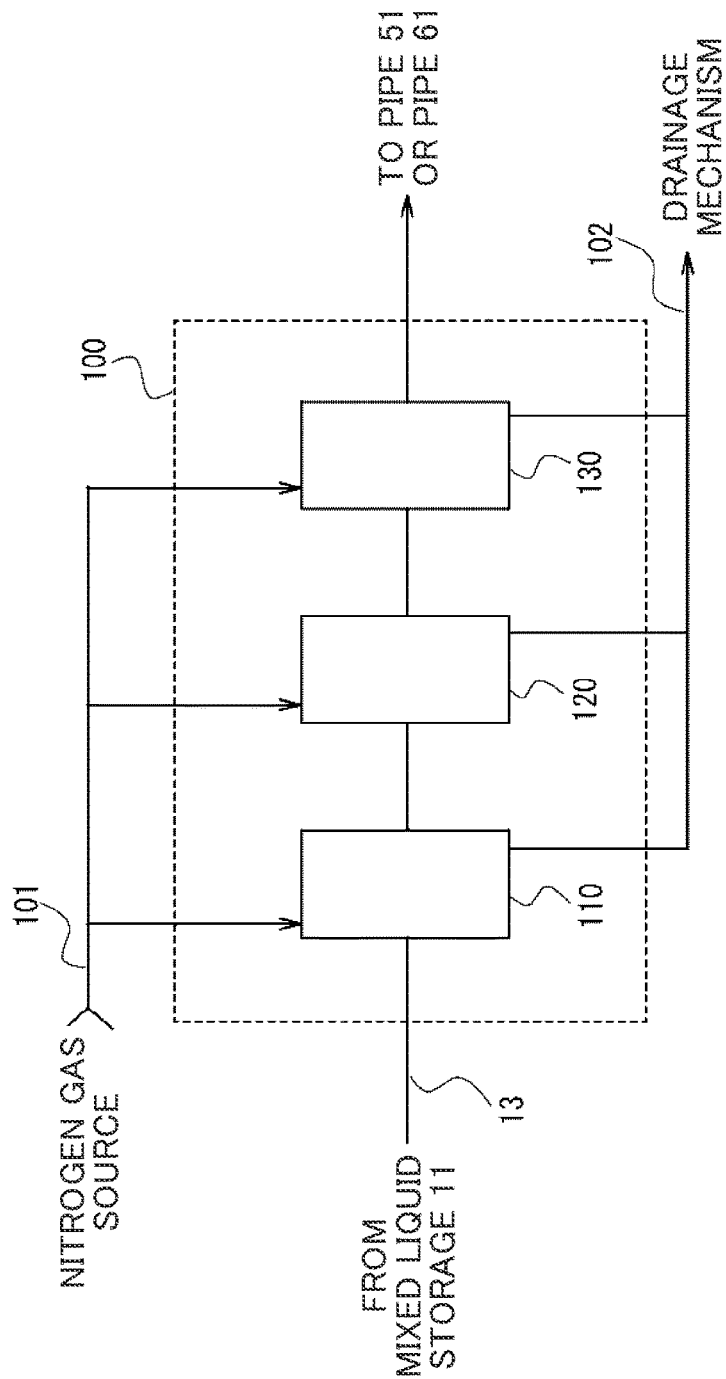
FIG. 3 is a schematic view showing the structure of a vapor dewatering unit according to the first preferred embodiment.

FIG. 3 is a schematic view showing the internal structure of the vapor dewatering unit 100. The vapor dewatering unit 100 includes a separating section 110, an absorbing section 120, and a foreign object remover 130. The vapor dewatering unit 100 removes water from the mixed vapor passing through the vapor supply pipe 13.

Assuming that the vapor supply pipe 13 has one end called an upstream-side end connected to the mixed liquid storage 11 and an opposite end called a downstream-side end, the separating section 110, the absorbing section 120, and the foreign object remover 130 are interposed in the vapor supply pipe 13 in this order as viewed from the upstream-side end.

The separating section 110 is formed of a separation membrane that separates IPA and water in the mixed vapor. The separating section 110 separates water in the mixed vapor as a target of separation from IPA using a pervaporation (PV) method. A zeolite membrane, a polyimide-based membrane, or a cellulose-based membrane can be used as the separation membrane. In the first preferred embodiment, a zeolite membrane widely used as a separation membrane for dewatering of alcohol and having considerably high hygroscopicity is used as the separation membrane of the separating section 110.

The absorbing section 120 is formed of an absorbing member that absorbs water in the mixed vapor. The absorbing section 120 absorbs water in the mixed vapor to remove the water from the mixed vapor selectively using the hygroscopicity of the absorbing member. In this way, the concentration of IPA in the mixed vapor is increased. In the first preferred embodiment, zeolite is used as a material for the absorbing member. However, a material for the absorbing member is not limited to zeolite in terms of implementing the present invention. Any material that selectively absorbs water in alcohol is usable as the absorbing member.

The foreign object remover 130 is formed of a porous filter element. The foreign object remover 130 is used to remove an impurity particle (such as a zeolite piece) resulting from passing the mixed vapor through the separating section 110 and the absorbing section 120. A glass fiber filter, a membrane filter, or a publicly-known filter for solvents can be used as the filter element. In the first preferred embodiment, a membrane filter having resistance to organic solvents and widely used in a semiconductor cleaning step is used as the filter element.

The vapor dewatering unit 100 has a gas supply pipe 101 connected to each of the separating section 110, the absorbing section 120, and the foreign object remover 130. The gas supply pipe 101 has one end connected to a nitrogen gas source and branched opposite ends connected to the separating section 110, the absorbing section 120, and the foreign object remover 130. A valve not shown in the drawings is interposed in the gas supply pipe 101. Supply of a nitrogen gas to the separating section 110, the absorbing section 120, and the foreign object remover 130 is controlled using this valve.

A nitrogen gas supplied from the nitrogen gas source has a dew point controlled at −40° C. or less, preferably −80° C. or less. This nitrogen gas is controlled at ordinary temperatures or a temperature higher than ordinary temperatures. The nitrogen gas used in the first preferred embodiment is at a temperature of 40° C.

The nitrogen gas source may be a tank provided in the vapor drying apparatus 1. Alternatively, the nitrogen gas source may be a plant facility such as a large-size tank provided in a plant and outside the vapor drying apparatus 1 or a movable tank brought into the plant from outside.

During dewatering of the mixed vapor at the separating section 110 and the absorbing section 120, the mixed vapor is condensed in these sections. This causes the risk of the mixed vapor flowing into the substrate processor 90 at a reduced rate or the risk of reduction in dewatering performance at the separating section 110 and the absorbing section 120.

In response, the gas supply pipe 101 is provided as shown in FIG. 3 through which a nitrogen gas of a low dew point and a high temperature is supplied to each section of the vapor dewatering unit 100 after the vapor drying process described later, for example. In doing so, the mixed liquid resulting from condensation of the mixed vapor can be dried or the mixed vapor remaining in these sections can be removed. As a result, a flow rate at a certain level or more and dewatering performance at a certain level or more can always be ensured in each section of the vapor dewatering unit 100.

In the first preferred embodiment, the gas supply pipe 101 is configured to be connected to each of the separating section 110, the absorbing section 120, and the foreign object remover 130. However, this is not the only configuration of the gas supply pipe 101 in terms of implementing the present invention. The gas supply pipe 101 may be configured to be connected only to the separating section 110, only to the absorbing section 120, or only to the separating section 110 and the absorbing section 120.

In the first preferred embodiment, gas supplied through the gas supply pipe 101 to the separating section 110, the absorbing section 120, and the foreign object remover 130 is a nitrogen gas. However, the gas to be supplied is not limited to a nitrogen gas in terms of implementing the present invention. Instead of a nitrogen gas, an argon gas or clean dried air (CDA) containing 80% of nitrogen and 20% of oxygen and having a dew point of −40° C. or less may be supplied.

The vapor dewatering unit 100 has a drainage pipe 102 connected to each of the separating section 110, the absorbing section 120, and the foreign object remover 130. The drainage pipe 102 has one end connected to a drainage mechanism and branched opposite ends connected from below to the separating section 110, the absorbing section 120, and the foreign object remover 130. The mixed liquid resulting from condensation of the mixed vapor in each section of the vapor dewatering unit 100 is emitted through the drainage pipe 102 into the drainage mechanism. A valve not shown in the drawings is interposed in the drainage pipe 102. Emission of the mixed liquid from the separating section 110, the absorbing section 120, and the foreign object remover 130 is controlled using this valve.

In the first preferred embodiment, the drainage pipe 102 is configured to be connected to each of the separating section 110, the absorbing section 120, and the foreign object remover 130. However, this is not the only configuration of the drainage pipe 102 in terms of implementing the present invention. The drainage pipe 102 may be configured to be connected only to the separating section 110, only to the absorbing section 120, or only to the separating section 110 and the absorbing section 120.

A pump may be interposed further in the vapor supply pipe 13. By the presence of the interposed pump, the mixed vapor in the vapor supply pipe 13 can be supplied positively to the substrate processor 90.

If the mixed vapor generated in the mixed liquid storage 11 and supplied to the vapor supply pipe 13 is cooled inside the vapor supply pipe 13 or the vapor dewatering unit 100, the mixed vapor may be condensed in these part to return to the state of the mixed liquid.

Depending on a place where condensation occurs, the mixed liquid may face the risk of being dripped onto the substrate W. Additionally, a path for the mixed vapor in the vapor dewatering unit 100 may be blocked by the mixed liquid to cause the risk of reduction in the flow rate of the mixed vapor to be supplied to the substrate W. To avoid these risks, a temperature controlling mechanism may be provided in the vapor supply pipe 13 or the vapor dewatering unit 100 to control the insides of these parts at a temperature from about 50 to about 60° C.

Referring back to FIG. 1, the vapor supplying apparatus 10 includes the mixed vapor supply 50 that supplies the mixed vapor to the mixed liquid storage 11.

The mixed vapor supply 50 includes the mixed vapor storage 52, the pipe 51, the valve V7, a pipe 53, and a valve V8. The mixed vapor storage 52 stores the mixed vapor. The pipe 51 connects the mixed vapor storage 52 and the vapor supply pipe 13. The valve V7 is interposed in the pipe 51 and controls communication between the vapor supply pipe 13 and the mixed vapor storage 52. The pipe 53 connects the mixed vapor storage 52 and the mixed liquid storage 11. The valve V8 is interposed in the pipe 53 and controls communication between the mixed vapor storage 52 and the mixed liquid storage 11.

The mixed vapor storage 52 is a tank storing the mixed vapor inside. To prevent mixture of external air or water into the mixed vapor, the mixed vapor storage 52 is hermetically closed except for the connection to the pipes 51 and 53. This shields the mixed vapor in the mixed vapor storage 52 from an external atmosphere.

The valve V7 is electrically connected to the controller 70. The valve V7 is opened and closed in response to an operational command from the controller 70. If the valve V7 is opened in response to an operation command from the controller 70 to the valve V7, the vapor supply pipe 13 and the mixed vapor storage 52 communicate with each other. At this time, if the valve V5 is opened and the mixed vapor is supplied from the mixed liquid storage 11 to the vapor supply pipe 13, the mixed vapor is supplied to the mixed vapor storage 52 through the pipe 51 and stored in the mixed vapor storage 52. If the valve V7 is closed in response to an operation command from the controller 70 to the valve V7, the communication between the vapor supply pipe 13 and the mixed vapor storage 52 is cut. Thus, the mixed vapor flowing in the vapor supply pipe 13 is not supplied to the mixed vapor storage 52.

A pump may be interposed further in the pipe 51 and between the valve V7 and the mixed vapor storage 52 to supply the mixed vapor in the vapor supply pipe 13 positively to the mixed vapor storage 52.

A check valve may be interposed further in the pipe 51 to prevent the mixed vapor from flowing backward from the mixed vapor storage 52 toward the vapor supply pipe 13.

The valve V8 is electrically connected to the controller 70. The valve V8 is opened and closed in response to an operational command from the controller 70. If the valve V8 is opened in response to an operation command from the controller 70 to the valve V8, the mixed vapor storage 52 and the mixed liquid storage 11 communicate with each other. If the mixed vapor is stored in the mixed vapor storage 52, this mixed vapor is supplied through the pipe 53 to the mixed liquid storage 11.

As described later, by using a high-pressure nitrogen gas from the nitrogen gas source in the vapor generator 20 for supply of the mixed vapor to the mixed vapor storage 52, the mixed vapor in a positive pressure higher than atmospheric pressure is stored in the mixed vapor storage 52. If the inner pressure of the mixed liquid storage 11 is atmospheric pressure and the inner pressure of the mixed vapor storage 52 is higher than atmospheric pressure when the valve V8 is opened, the mixed vapor is supplied from the mixed vapor storage 52 to the mixed liquid storage 11 through the pipe 53 accordingly.

If the valve V8 is closed in response to an operation command from the controller 70 to the valve V8, the communication between the mixed vapor storage 52 and the mixed liquid storage 11 is cut. Thus, the mixed vapor stored in the mixed vapor storage 52 is not supplied to the mixed liquid storage 11.

If the mixed vapor is cooled in the pipe 51, the mixed vapor storage 52, or the pipe 53, the mixed vapor may be condensed in these parts to return to the state of the mixed liquid. This causes the risk of dripping of the mixed liquid inside the pipe or the storage. To avoid this risk, a temperature controlling mechanism may be provided in the pipe 51, the mixed vapor storage 52, or the pipe 53 to control the insides of these parts at a temperature from about 50 to about 60° C., thereby suppressing condensation of the mixed vapor.

Each unit of the substrate processor 90 is described next.

The substrate processor 90 includes the chamber 91 housing the substrate W. The chamber 91 has a side wall, a ceiling, and a bottom surface that form processing space for processing on the substrate W.

The substrate processor 90 further includes a shutter 93 through which the substrate W is brought into the chamber 91 and taken out of the chamber 91, a holder (not shown in the drawings) that holds the substrate W brought into the chamber 91, and the nozzle 92 from which the mixed vapor is supplied onto the main surface of the substrate W held by the holder.

The nozzle 92 is provided with a moving mechanism not shown in the drawings. This moving mechanism is electrically connected to the controller 70. In response to an operational command from the controller 70, the nozzle 92 is placed in a position facing the main surface of the substrate W. The shutter 93 and the holder are also electrically connected to the controller 70. In response to an operational command from the controller 70, the shutter 93 is opened and closed and the state of the substrate W being held by the holder is controlled.

The substrate processor 90 further includes the nitrogen gas mixing unit 60 that mixes a nitrogen gas with the IPA vapor supplied from the vapor supplying apparatus 10. The nitrogen gas mixing unit 60 includes the pipe 61 and the valve V6. The pipe 61 connects the vapor supply pipe 13 and the nozzle 92. The valve V6 is interposed in the pipe 61 and controls communication between the vapor supply pipe 13 and the nozzle 92.

The nitrogen gas mixing unit 60 further includes a pipe 62 and a valve V9. The pipe 62 braches off the pipe 61 from a point between the valve V6 and the nozzle 92 to connect the pipe 61 and a nitrogen gas source. The valve V9 is interposed in the pipe 62 and controls communication between the pipe 61 and the nitrogen gas source.

The nitrogen gas source is a gas source from which a nitrogen gas is supplied to the pipe 62 (for example, the nitrogen gas source is a gas cylinder storing a compressed nitrogen gas). The nitrogen gas source may be a gas cylinder provided inside the vapor drying apparatus 1. Alternatively, the nitrogen gas source may be a plant facility such as a large-size gas cylinder provided in a plant and outside the vapor drying apparatus 1 or a movable gas cylinder brought into the plant from outside. In the first preferred embodiment, gas to be supplied from the nitrogen gas source is a nitrogen gas having a dew point of $-40°$ C. or less, preferably $-80°$ C. or less and a nitrogen concentration of 99.999% by volume or more.

The valve V6 is electrically connected to the controller 70. The valve V6 is opened and closed in response to an operational command from the controller 70. If the valve V6 is opened in response to an operation command from the controller 70 to the valve V6, the vapor supply pipe 13 and the nozzle 92 communicate with each other to supply the mixed vapor flowing in the vapor supply pipe 13 to the nozzle 92 through the pipe 61. If the valve V6 is closed in response to an operation command from the controller 70 to the valve V6, the communication between the vapor supply pipe 13 and the nozzle 92 is cut. Thus, the mixed vapor flowing in the vapor supply pipe 13 is not supplied to the nozzle 92.

If the valve V6 is opened while the valve V5 is opened, the mixed liquid storage 11 and the nozzle 92 of the substrate processor 90 are connected through the vapor supply pipe 13 and the pipe 61.

The valve V9 is electrically connected to the controller 70. The valve V9 is opened and closed in response to an operational command from the controller 70. If the valve V9 is opened in response to an operation command from the controller 70 to the valve V9, the nitrogen gas source and the pipe 61 communicate with each other to supply a nitrogen gas from the nitrogen gas source to the pipe 61 and the nozzle 92 through the pipe 62. If the valve V9 is closed in response to an operation command from the controller 70 to the valve V9, the communication between the nitrogen gas source and the pipe 61 is cut to stop supply of the nitrogen gas from the nitrogen gas source to the pipe 61 and the nozzle 92.

If the mixed vapor is cooled in the pipe 61, the mixed vapor may be condensed in the pipe 61 to return to the state of the mixed liquid. This causes the risk of dripping of the mixed liquid onto the substrate W. To avoid this risk, a temperature controlling mechanism may be provided in the pipe 61 to control the inside of the pipe 61 at a temperature from about 50 to about $60°$ C., thereby suppressing condensation of the mixed vapor. Further, the pipe 62 is communicatively connected to the pipe 61. This causes the probability of flow of the mixed vapor into the pipe 62. Thus, the aforementioned temperature controlling mechanism may also be provided in the pipe 62 to suppress condensation of the mixed vapor.

The structure of the controller 70 is described next by referring to FIG. 4. FIG. 4 is a block diagram showing the structure of the controller 70 and a connection between the controller 70 and each component of the vapor drying apparatus 1. The controller 70 is electrically connected to each component of the vapor drying apparatus 1, specifically, to the sensor 14, the heater 22, the pump 32, the substrate processor 90, and each of the valves V1 to V11. The controller 70 controls the operation of each component of the vapor drying apparatus 1.

The controller 70 is formed of a computer having a CPU 71 that performs various computing operations and a storage 72. The storage 72 includes a ROM 721 as a read-only memory storing a basic program, a RAM 722 as a freely readable and writable memory storing information of various types, and a magnetic disk 723 storing control software or control data, etc. The magnetic disk 723 contains a condition for substrate processing determined according to the type of the substrate W that is stored in advance as a program 73 (also called a recipe). The CPU 71 reads the content of the program 73 and stores the read content in the RAM 722. The CPU 71 controls each component of the vapor drying apparatus 1 based on the content of the program 73 stored in the RAM 722.

The controller 70 further includes a reader 75 that reads a storage medium 74 storing a program for change or addition. The storage medium 74 is inserted from outside into the reader 75. The program for change or addition in the storage medium 74 is read by the reader 75 is stored as the program 73 in the storage 72.

The controller 70 is connected to a display unit 76 and an input unit 77. The display unit 76 is to notify an operator of a program 73 currently selected and the state of the vapor drying apparatus 1, for example. The input unit 77 is used by the operator for generating or changing a program 73 or selecting an intended one from multiple programs 73.

<1-2. Processing Step>

Process of supplying vapor and substrate processing in the vapor drying apparatus 1 of the aforementioned configuration are described next. A pattern with projections and depressions is already formed on the main surface of the substrate W. The pattern includes the projections and depressions. In the first preferred embodiment, the height of the projections is in a range from 100 to 200 nm and the width of the projections is in a range from 10 to 20 nm. A distance between adjacent projections (the width of the depressions) is in a range from 10 to 1000 nm. As a result of wet process performed in advance, DIW already adheres as a rinsing liquid to the main surface of the substrate W.

The substrate W used in the first preferred embodiment has the pattern on the aforementioned scale. However, this is not the only example of the substrate W in terms of implementing the present invention. The substrate W to be subjected to substrate processing described later may be a substrate provided with a pattern on a scale out of the aforementioned ranges or a substrate not provided with a pattern with projections and depressions on a front surface.

Figure 5:
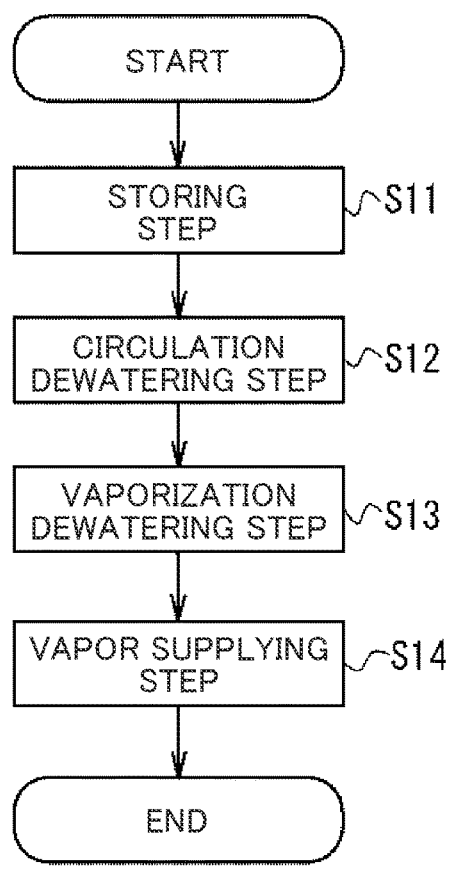
FIG. 5 is a flowchart showing a vapor drying method according to the first preferred embodiment.

A vapor supplying method according to the first preferred embodiment is described below by referring to FIG. 5. FIG. 5 is a flowchart showing operation by the vapor supplying apparatus 10 of the first preferred embodiment to supply vapor to the substrate processor 90.

First, a program 73 responsive to a designated substrate W is selected by an operator on the input unit 77 (see FIG. 4) and the operator instructs execution of the program 73. Then, each component of the vapor supplying apparatus 10 comes into operation in response to an operational command from the controller 70.

To supply the mixed vapor of a reduced water content to the substrate processor 90, the vapor supplying apparatus 10 performs the following vapor supplying process. The vapor supplying apparatus 10 performs a storing step (S11), a circulation dewatering step (S12), a vaporization dewatering step (S13), and a vapor supplying step (S14).

The storing step (S11) is a step of supplying the mixed liquid from the mixed liquid source to the mixed liquid storage 11 and storing the supplied mixed liquid in the mixed liquid storage 11. The circulation dewatering step (S12) is a step of introducing the mixed liquid stored in the mixed liquid storage 11 into the circulation dewatering unit 30 and returning the mixed liquid having been subjected to dewatering by the dewatering part 33 to the mixed liquid storage 11. The vaporization dewatering step (S13) is a step of generating the mixed vapor by heating the mixed liquid stored in the mixed liquid storage 11 using the heater 22 after the sensor 14 determines that a water concentration in the mixed liquid becomes a first designated value or less (in the first preferred embodiment, 0.001% by weight or less) as a result of the circulation dewatering step, and emitting the generated mixed vapor to the outside of the mixed liquid storage 11 using the exhaust unit 40. The vapor supplying step (S14) is a step of generating the mixed vapor by supplying nitrogen gas from the nitrogen gas source through the pipe 21 into the mixed liquid in the mixed liquid storage 11 after the sensor 14 determines that a water concentration in the mixed liquid becomes a second designated value or less (in the first preferred embodiment, 0.0005% by weight or less) as a result of the vaporization dewatering step, and feeding the generated mixed vapor to the substrate processor 90 through the vapor supply pipe 13.

Each of the aforementioned steps (S11 to S14) is described in detail by referring to FIGS. 1, 2, and 4 appropriately.

After the operator selects the program 73 and instructs execution of the program 73, the controller 70 determines whether each component of the vapor drying apparatus 1 is in an initial state. If some component is not in the initial state, the controller 70 gives an operational command to place each component in the initial state. In the initial state, all the valves V1 to V11 are closed and a pump in each place such as the pump 32 stops operation in the vapor drying apparatus 1. In the initial state, the heater 22 stops operation, so that the mixed liquid storage 11 is not heated. After confirming the initial state, the controller 70 performs all the steps (S11 to S14) sequentially.

When the storing step (S11) is started in response to an operational command from the controller 70, the controller 70 first determines the presence or absence of a sensing signal from the liquid level sensor provided to the mixed liquid storage 11. If the sensing signal is not given so the liquid level is determined to be lower than a designated height, the controller 70 gives an operational command to the valve V1 to open the valve V1. In response, the mixed liquid is supplied from the mixed liquid source through the pipe 12 to the mixed liquid storage 11.

In response to supply of the mixed liquid from the mixed liquid source, the liquid level of the mixed liquid in the mixed liquid storage 11 increases. If the liquid level becomes the designated height or more to be sensed by the liquid level sensor, the liquid level sensor transmits a sensing signal to the controller 70. In response to receipt of the sensing signal, the controller 70 gives an operational command to the valve V1 to close the valve V1. This stops supply of the mixed liquid from the mixed liquid source to the mixed liquid storage 11.

The mixed liquid supplied from the mixed liquid source contains 0.1% by weight of water and 99.9% by weight of IPA.

If atmosphere in the mixed liquid storage 11 or in the pipe 12 contains water vapor, IPA absorbs this water vapor. In this case, an IPA concentration in the mixed liquid stored in the mixed liquid storage 11 becomes lower than that in the mixed liquid supplied from the mixed liquid source and a water concentration in the mixed liquid stored in the mixed liquid storage 11 becomes higher than that in the mixed liquid supplied from the mixed liquid source.

If the mixed liquid is already stored in the mixed liquid storage 11, an IPA concentration and a water concentration in the mixed liquid in the mixed liquid storage 11 determined after the mixed liquid is added from the mixed liquid source depend on an IPA concentration and a water concentration in the mixed liquid already stored in the mixed liquid storage 11.

After the controller 70 determines that the liquid level is the designated height or more and the valve V1 is closed, the circulation dewatering step (S12) is started. When the circulation dewatering step is started, the controller 70 gives an operational command to the circulation dewatering unit 30 to operate the pump 32 and open the valve V3 and the valve V10 (see FIG. 2).

When the pump 32 is operated and the valves V3 and V10 are opened in response to the operational command from the controller 70, the mixed liquid stored in the mixed liquid storage 11 is introduced into the dewatering part 33 through the pipe 31.

In the dewatering part 33, the mixed liquid passes through the separating section 331 and the absorbing section 332 sequentially. Then, water is separated from the mixed liquid and the separated water is absorbed. In this way, the water in the mixed liquid is removed, specifically, the mixed liquid is subjected to the dewatering process. A fine impurity particle occurring at the separating section 331 and the absorbing section 332 is filtered out with the filter 333. As a result, the mixed liquid after passing through the dewatering part 33 is allowed to have a lower water concentration and a higher IPA concentration than those of the mixed liquid before being introduced into the dewatering part 33.

After being subjected to the dewatering process while passing through the dewatering part 33, the mixed liquid passes through the pipe 34 to return to the mixed liquid storage 11. The mixed liquid of a higher IPA concentration after being subjected to the dewatering process is stored in the mixed liquid storage 11 and mixed with the mixed liquid before being subjected to the dewatering process. This increases an IPA concentration in the entire mixed liquid stored in the mixed liquid storage 11.

In the circulation dewatering step (S12), the controller 70 may check a water concentration in the mixed liquid stored in the mixed liquid storage 11 using the sensor 14 before giving an operational command to the circulation dewatering unit 30. In this case, the controller 70 checks the water concentration sensed by the sensor 14. If the water concentration sensed by the sensor 14 is the first designated value or more, the controller 70 gives an operational command to the circulation dewatering unit 30. In doing so, if the water concentration is already at a value less than the first designated value, the circulation dewatering step (S12) can be omitted.

In the first preferred embodiment, the first designated value is 0.001% by weight (specifically, 10 ppm). If the sensor 14 is to sense an IPA concentration, the controller 70 may be configured to give an operational command to the circulation dewatering unit 30 to operate the pump 32 and open the valve V3 if the IPA concentration sensed by the sensor 14 is a third designated value or less. The third designated value mentioned herein is 99.999% by weight.

The first designated value is not limited to 0.001% by weight. Meanwhile, the first designated value is preferably set at a water concentration in the mixed liquid supplied from the mixed liquid source or less. In the first preferred embodiment, a value selected as the first designated value is preferably 0.01% by weight or less.

Likewise, the third designated value is not limited to 99.999% by weight. Meanwhile, the third designated value is preferably set at an IPA concentration in the mixed liquid supplied from the mixed liquid source or more. In the first preferred embodiment, a value selected as the third designated value is preferably 99.99% by weight or more.

Each time a designated period of time has elapsed after the circulation dewatering step (S12) is started, the controller 70 checks a water concentration in the mixed liquid sensed by the sensor 14. More specifically, the controller 70 gives an operational command to the valve V11 to drip the mixed liquid of a given amount onto the sensor 14 through the pipe 15. Then, the controller 70 checks a water concentration in the mixed liquid sensed by the sensor 14. If determining that the water concentration sensed by the sensor 14 becomes less than the first designated value, the controller 70 starts the vaporization dewatering step (S13). In the first preferred embodiment, the circulation dewatering step (S12) continues for a designated period of time even after the vaporization dewatering step (S13) is started. After elapse of this period of time, the circulation dewatering step is finished.

Specifically, after the designated period of time has elapsed after the controller 70 receives a signal from the sensor 14 indicating that a water concentration becomes less than the first designated value, the pump 32 is stopped and the valves V3 and V10 are closed in response to an operational command from the controller 70. In this way, introduction of the mixed liquid from the mixed liquid storage 11 into the dewatering part 33 is stopped and return of the mixed liquid from the dewatering part 33 to the mixed liquid storage 11 is stopped. Elapse of the period of time is determined using a count by a timer not shown in the drawings provided to the controller 70.

When the vaporization dewatering step (S13) is started, the controller 70 gives an operational command to the vapor generator 20 to operate the heater 22. In response, the heater 22 starts heating the mixed liquid in the mixed liquid storage 11. In the first preferred embodiment, the heater 22 heats the mixed liquid to a temperature from about 50 to about 60° C. This increases the vapor pressure of the mixed liquid, thereby generating the mixed vapor containing IPA vapor and water vapor from the surface of the mixed liquid.

The controller 70 further gives an operational command to the exhaust unit 40 to open the valve V4. Thus, the mixed vapor generated by the heater 22 is emitted to the exhaust mechanism through the pipe 41.

Figure 6:
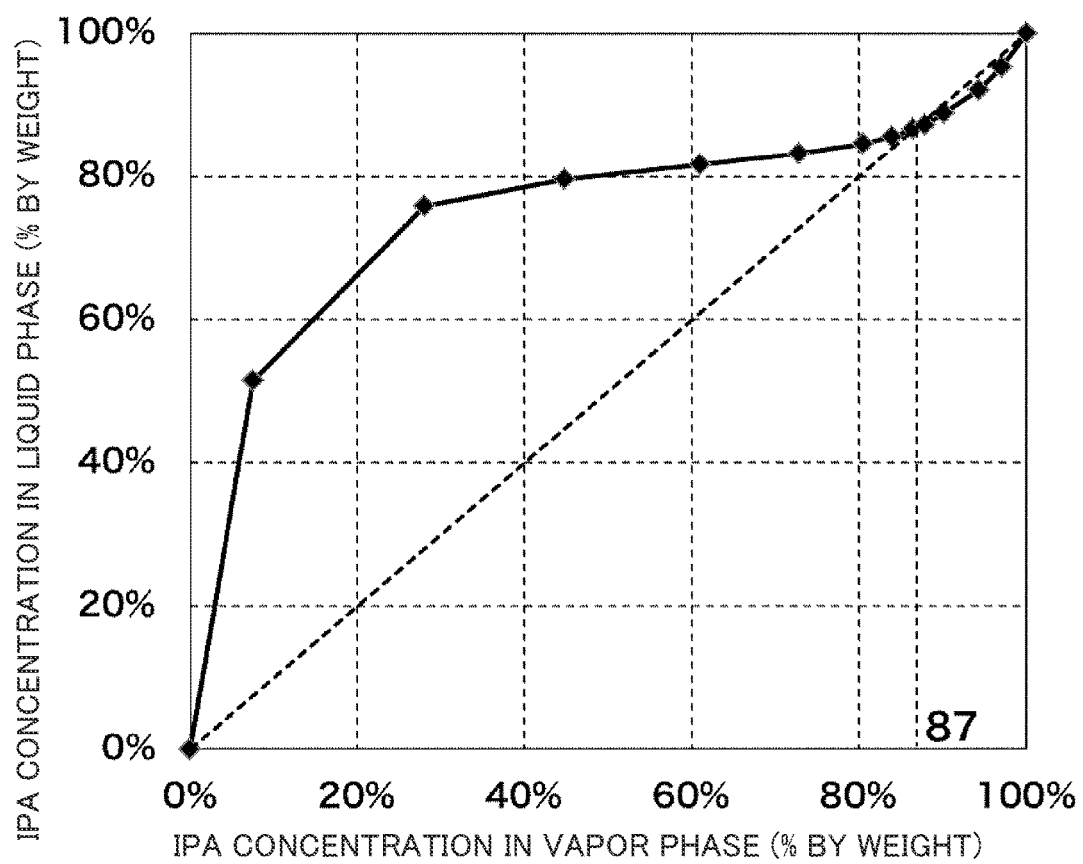
FIG. 6 is a graph showing a vapor-liquid equilibrium curve in an IPA solution.

The following describes a ratio between IPA vapor and water vapor in the mixed vapor generated by the heater 22 and a ratio between IPA and water in the mixed liquid stored in the mixed liquid storage 11. FIG. 6 shows a vapor-liquid equilibrium curve relating to IPA and pure water.

The horizontal axis of FIG. 6 shows an IPA concentration in the mixed liquid specifically, in a liquid phase) containing IPA and pure water. The vertical axis of FIG. 6 shows an IPA (vapor) concentration in the mixed vapor (specifically, in a vapor phase) containing IPA vapor and water vapor generated by evaporating this mixed liquid.

If the mixed liquid of a sufficient amount having an IPA concentration of 61% by weight and containing 39% by weight of pure water is partially evaporated, for example, the resultant mixed vapor has an IPA vapor concentration of 82% by weight and a water vapor concentration of 18% by weight. This means that by generating the mixed vapor from the mixed liquid having the IPA concentration of 61% by weight, the resultant IPA vapor has a higher IPA concentration than an IPA concentration in the mixed liquid. Generally, this results from the property of IPA being higher in vapor pressure and volatilized more easily than pure water.

As shown in the vapor-liquid equilibrium curve of FIG. 6, this property can be found in the mixed liquid having an IPA concentration of 87% by weight or less. By evaporating the mixed liquid having an IPA concentration of 87% by weight, the mixed vapor having an IPA vapor concentration of 87% by weight is generated. Specifically, if the mixed liquid has the IPA concentration of 87% by weight, this IPA concentration in the mixed liquid and an IPA concentration in the mixed vapor generated from this mixed liquid become the same to cause what is called an azeotropic state. In the present invention, if an IPA concentration in the mixed liquid (specifically, the concentration of a low surface tension liquid) and an IPA vapor concentration (specifically, the vapor concentration of the low surface tension liquid) generated from this mixed liquid are the same, these IPA concentrations are called an "azeotropic concentration."

If an IPA concentration in this mixed liquid becomes higher than the azeotropic concentration, an IPA vapor concentration in the mixed vapor becomes lower than this IPA concentration in the mixed liquid. In other words, if a water concentration in this mixed liquid becomes lower than a water concentration while the IPA concentration is at the azeotropic concentration, a water vapor concentration in the mixed vapor becomes higher than this water concentration in the mixed liquid.

If the mixed liquid of a sufficient amount having an IPA concentration of 97% by weight and a pure water concentration of 3% by weight is partially evaporated, for example, the resultant mixed vapor has an IPA vapor concentration of 95% by weight and a water vapor concentration of 5% by weight. This means that by generating the mixed vapor from the mixed liquid having an IPA concentration higher than the azeotropic concentration, the resultant mixed vapor has a water concentration higher than the water concentration in the mixed liquid. By removing water vapor of a higher ratio in the mixed vapor from the mixed liquid, an IPA concentration is increased in the mixed liquid having been used for generation of the mixed vapor.

The vaporization dewatering step (S13) utilizes the aforementioned mechanism. Specifically, according to this mechanism, after a water concentration in the mixed liquid is reduced to the first designated value or less (in the first preferred embodiment, 0.001% by weight or less while an IPA concentration is the azeotropic concentration or more) by the circulation dewatering step (S12), the mixed vapor is generated from the surface of the mixed liquid by the heater 22. This makes a water vapor concentration in this mixed vapor higher than the water concentration in the mixed liquid to reduce the water concentration in the mixed liquid having been used for generation of the mixed vapor.

In the vaporization dewatering step, the controller 70 further gives an operational command to the mixed vapor supply 50 to open the valve V8, thereby supplying the mixed vapor from the mixed vapor storage 52 to the mixed liquid storage 11 through the pipe 53. This mixed vapor has an IPA vapor concentration higher than an IPA concentration in the mixed liquid stored in the mixed liquid storage 11 in the vaporization dewatering step. This mixed vapor supplied from the mixed vapor storage 52 is described in detail later.

In this way, the mixed vapor having an IPA vapor concentration higher than an IPA concentration in the mixed liquid stored in the mixed liquid storage 11 is supplied to the mixed liquid storage 11 in the vaporization dewatering step. Thus, the mixed liquid can be surrounded by atmosphere of a high IPA vapor concentration. As a result, water in the mixed liquid can be removed preferentially while evaporation of IPA from the mixed liquid in the mixed liquid storage 11 and emission of the resultant IPA vapor to the exhaust mechanism can be suppressed.

As described above, supplying the mixed vapor having an IPA vapor concentration higher than an IPA concentration in the mixed liquid stored in the mixed liquid storage 11 to the mixed liquid storage 11 in the vaporization dewatering step is a more preferable way of facilitating evaporation of water in the mixed liquid while suppressing evaporation of IPA from the mixed liquid in the mixed liquid storage 11. However, in terms of implementing the present invention, an IPA concentration in the mixed vapor may be lower than the aforementioned IPA vapor concentration to be used in the preferable way.

Generation of vapor from liquid is affected by what is called the humidity of the vapor in atmosphere surrounding the liquid. This means vaporization of IPA in the mixed liquid is affected by the humidity of IPA in atmosphere surrounding the mixed liquid.

The humidity of vapor is expressed in terms of the ratio of the partial pressure of the vapor in atmosphere surrounding liquid to a vapor pressure at the surface of the liquid from which the vapor is generated. With increase in the humidity in this atmosphere, the vapor is less likely to be generated from the liquid. Specifically, the humidity of IPA is expressed in terms of the ratio of the partial pressure of IPA vapor in atmosphere surrounding the mixed liquid to a saturated vapor pressure of the mixed liquid. With increase in the humidity of IPA in the atmosphere surrounding the mixed liquid, IPA is less likely to be vaporized from the mixed liquid.

A humidity is a value given independently to each type of vapor. For example, even if the humidity of IPA in the atmosphere surrounding the mixed liquid is 100%, specifically, even if the ratio of the partial pressure of IPA vapor in the atmosphere surrounding the mixed liquid to an IPA vapor pressure at the surface of the mixed liquid is 1.0 in the first preferred embodiment, water can still be removed from the mixed liquid resulting from evaporation of the water from the mixed liquid unless the humidity of water is 100%.

As described above, if the humidity of IPA in the mixed vapor is higher than that of water in the mixed vapor, evaporation of IPA in the mixed liquid can be suppressed and water can be evaporated preferentially to dewater the mixed liquid. In other words, if the ratio of the partial pressure of IPA vapor in the atmosphere surrounding the mixed liquid to an IPA vapor pressure at the surface of the mixed liquid is higher than the ratio of the partial pressure of water vapor in the atmosphere surrounding the mixed liquid to a water vapor pressure at the surface of the mixed liquid, evaporation of IPA in the mixed liquid can be suppressed and water can be evaporated preferentially to dewater the mixed liquid. Specifically, if the ratio of the partial pressure of IPA vapor in the mixed gas containing the mixed vapor to be supplied to the IPA vapor pressure at the surface of the mixed liquid is higher than the ratio of the partial pressure of water vapor in the mixed gas to the water vapor pressure at the surface of the liquid surface, the mixed liquid can be dewatered easily.

As a result of the vaporization dewatering step (S13), an IPA concentration in the mixed liquid stored in the mixed liquid storage 11 is increased while a water concentration in this mixed liquid is reduced.

Each time a designated period of time has elapsed after the vaporization dewatering step (S13) is started, the controller 70 gives an operational command to the valve V11 to drip the mixed liquid of a given amount onto the sensor 14 through the pipe 15. In doing so, the controller 70 checks a water concentration in the mixed liquid sensed by the sensor 14 each time the designated period of time has elapsed. If determining that the water concentration sensed by the sensor 14 becomes the second designated value or less, the controller 70 gives an operational command to the exhaust unit 40. Then, the valves V4 and V8 are closed. Next, the controller 70 starts the vapor supplying step (S14).

In the first preferred embodiment, the second designated value is 0.0005% by weight (specifically, 5 ppm). If the sensor 14 is to sense an IPA concentration, the controller 70 may give an operational command to the exhaust unit 40 and close the valves V4 and V8 if the IPA concentration sensed by the sensor 14 is a fourth designated value or more. The fourth designated value mentioned herein is 99.9995% by weight.

The second designated value is not limited to 0.0005% by weight. The second designated value is set to be smaller than the first designated value. Likewise, the fourth designated value is not limited to 99.9995% by weight. The fourth designated value is set to be larger than the third designated value.

The mixed liquid having an IPA concentration at the azeotropic concentration or more (99.9% of IPA) is already stored in the mixed liquid storage 11 at a time when the storing step (S11) is performed. Thus, even if this mixed liquid has a water concentration at the first designated value (0.001% by weight) or more, performing the vaporization dewatering step (S13) can still achieve the effect of utilizing the azeotropic concentration without performing the circulation dewatering step (S12) to obtain a water concentration at the first designated value or less.

However, performing the vaporization dewatering step causes loss of IPA from the mixed liquid storage 11 as described above. In this regard, the circulation dewatering step is performed in advance before the vaporization dewatering step to increase an IPA concentration to some extent. Then, the vaporization dewatering step is performed. This can remove water in a tiny amount remaining in the mixed liquid storage 11 while suppressing loss of IPA.

Performing only the circulation dewatering step continuously can still reduce a water concentration to the second designated value or less. However, if a water concentration is reduced to some extent, the efficiency of dewatering by the dewatering part 33 is reduced. This extends a period of time required after the storing step (S11) to obtain a low water concentration at the second designated value or less.

Figure 7:
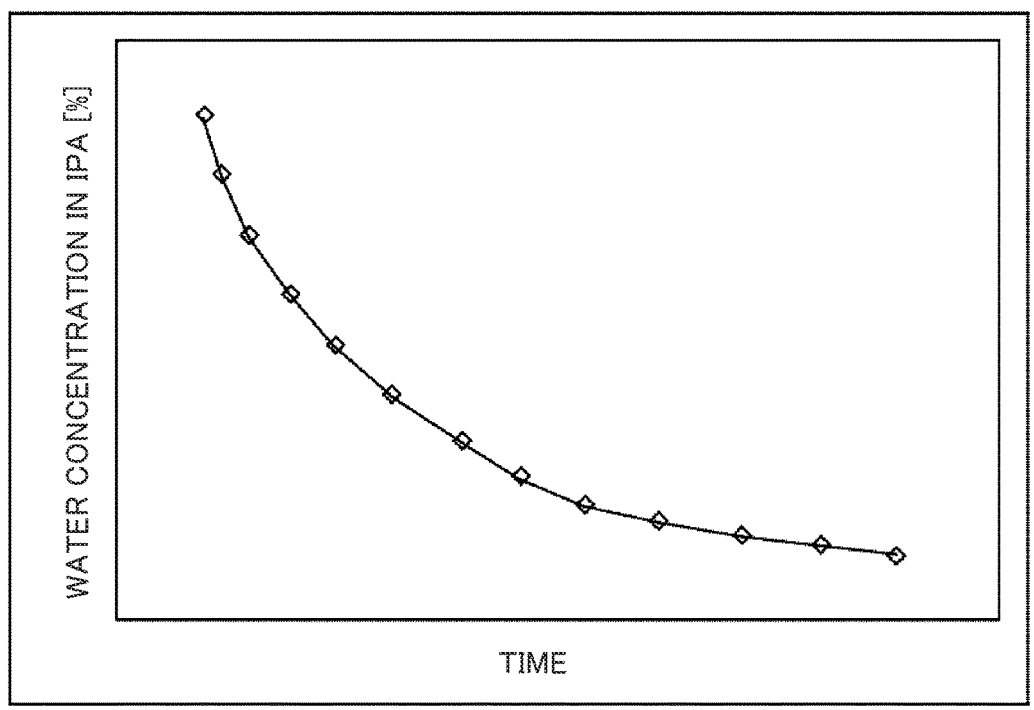
FIG. 7 is a conceptual view showing a water concentration determined each time a period of time has elapsed during dewatering of mixed liquid.

FIG. 7 shows a relationship between reduction in water concentration resulting from removal of water by the dewatering part 33 and a period of time elapsed after the circulation dewatering step is started. As shown in FIG. 7, the slope of a graph line becomes more gentle with reduction in water concentration. Specifically, with reduction in water concentration, the efficiency of removing water by the dewatering part 33 is reduced. If a water concentration in the mixed liquid in the mixed liquid storage 11 drops to a certain low level, the extent of reduction in water concentration by the dewatering part 33 is saturated.

The separating section 331, the absorbing section 332, and the filter 333 of the dewatering part 33 are generally consumable items. Thus, the aforementioned long-time use of these items shortens a cycle of exchange of these items, leading to increase in maintenance load of the apparatus.

In this regard, in the first preferred embodiment, when a water concentration in the mixed liquid in the mixed liquid storage 11 reaches a value (in the first preferred embodiment, the first designated value) at which the efficiency of removing water by the dewatering part 33 starts to be reduced or less, the vaporization dewatering step is performed. This can remove water in a tiny amount remaining in the mixed liquid storage 11 while restricting time of use of the dewatering part 33 (specifically, while suppressing a maintenance load of the apparatus).

As understood from above, an optimum of the first designated value depends on the function of the dewatering part 33. The relationship shown in FIG. 7 may be obtained in advance using the dewatering part 33 and a water concentration responsive to an intended slope may be determined as the first designated value.

Referring back to FIG. 5, the vapor supplying step (S14) is described next.

Simultaneously with or prior to the vapor supplying step (S14), the controller 70 makes the substrate processor 90 perform the step of bringing in and holding the substrate W.

In the step of bringing in and holding the substrate W, the controller 70 gives an operational command to each component of the substrate processor 90. Then, the shutter 93 is opened, the substrate W is brought into the chamber 91, and the substrate W is held by the holder (not shown in the drawings). Then, the shutter 93 is closed. Further, the nozzle 92 is placed in a position facing the main surface of the substrate W. Before or after the substrate W is brought into the chamber 91, a wet processor not shown in the drawings provided inside the chamber 91 performs wet process on the substrate W. Thus, a processing liquid such as a chemical liquid or a rinsing liquid (hereinafter simply called a "processing liquid") adheres to the main surface of the substrate W.

The vapor supplying step (S14) is a step of supplying the mixed vapor generated in the mixed liquid storage 11 to the vapor supply pipe 13. When the vapor supplying step (S14) is started, the controller 70 gives an operational command to the vapor generator 20. In response, the heater 22 continues heating the mixed liquid in the mixed liquid storage 11 and the valve V2 is opened. This supplies a nitrogen gas from the nitrogen gas source into the mixed liquid in the mixed liquid storage 11 through the pipe 21. As a result, the mixed gas of the mixed vapor and the nitrogen gas is generated in the mixed liquid storage 11.

The controller 70 further gives an operational command to the valve V5 to open the valve V5. This supplies the mixed vapor generated in the mixed liquid storage 11 into the vapor supply pipe 13.

Then, the mixed vapor is introduced from the mixed liquid storage 11 into the vapor dewatering unit 100 through the vapor supply pipe 13. The mixed vapor passes through the separating section 110 and the absorbing section 120 to remove water in the mixed vapor, thereby obtaining a higher IPA concentration. Then, a foreign object such as a zeolite piece mixed into the mixed vapor during passing through the separating section 110 and the absorbing section 120 is removed from the mixed vapor as the mixed vapor passes through the foreign object remover 130. In this way, an IPA concentration in the mixed vapor generated from the mixed liquid storage 11 can be increased further.

Next, the controller 70 gives an operational command to the valve V6 to open the valve V6. This makes the mixed vapor having passed through the vapor dewatering unit 100 travel through the pipe 61. Then, the mixed vapor is supplied to the substrate W from the nozzle 92 in the chamber 91. By supplying the mixed vapor, the mixed vapor takes the place of the processing liquid adhering to the front surface of the substrate W, thereby removing the processing liquid from the front surface of the substrate W.

After the processing liquid on the front surface of the substrate W is replaced by the mixed vapor so the front surface of the substrate W is covered with the mixed liquid, the controller 70 gives an operational command to the valve V9 to open the valve V9. Further, the controller 70 gives an operational command to the valve V6 to close the valve V6. As a result, the communication between the nozzle 92 and the mixed liquid storage 11 is cut to stop supply of the mixed vapor to the substrate W. Further, a nitrogen gas is supplied from the nitrogen gas source to the pipe 61 to vaporize the mixed liquid on the front surface of the substrate W.

As a result, the mixed liquid on the front surface of the substrate W is removed to complete the vapor drying process on the substrate W.

The mixed vapor to become a source for the mixed liquid covering the front surface of the substrate W contains water of a concentration reduced to 5 ppm or less as a result of the circulation dewatering step (S12) and the vaporization dewatering step (S13). Specifically, the water concentration in this mixed vapor is lower than that determined in the absence of the circulation dewatering step and the vaporization dewatering step. Thus, water of a reduced amount remains on the front surface of the substrate W while the mixed liquid covering the front surface of the substrate W is removed from the substrate W. This prevents the occurrence of collapse of the pattern on the front surface of the substrate W due to the water in the mixed liquid.

The mixed vapor to become the source for the mixed liquid covering the front surface of the substrate W has a water concentration lower than that in the mixed liquid stored in the mixed liquid storage 11 as a result of passing through the vapor dewatering unit 100 in the vapor supplying step (S14). Thus, water of a reduced amount remains on the front surface of the substrate W while the mixed liquid covering the front surface of the substrate W is removed from the substrate W. This prevents the occurrence of collapse of the pattern on the front surface of the substrate W due to the water in the mixed liquid.

After the valve V6 is closed, the controller 70 gives an operational command to the valve V7 to open the valve V7. Meanwhile, supply of a nitrogen gas from the nitrogen gas source in the vapor generator 20 to the mixed liquid storage 11 continues. The pressure of this nitrogen gas supplied from the nitrogen gas source to the mixed liquid storage 11 is a positive pressure higher than atmospheric pressure. Only the valves V2, V5, and V7 are opened at this stage, so that the pressure of the mixed vapor generated by passing the nitrogen gas through the mixed liquid in the mixed liquid storage 11 is a positive pressure higher than atmospheric pressure. Thus, after passing through the vapor supply pipe 13, the vapor dewatering unit 100, and the pipe 51, this mixed vapor is stored in the mixed vapor storage 52 in the positive pressure.

As a result, the mixed vapor containing water of a concentration not exceeding the second designated value can be stored in the mixed vapor storage 52 in preparation for the subsequent vaporization dewatering step.

After the vapor drying process on the substrate W is finished in the vapor supplying step, the controller 70 gives an operational command to each component of the vapor drying apparatus 1 to close the valves V9, V5, V2, and V7. Then, the controller 70 stops the operation of the heater 22, opens the shutter 93, and takes the substrate W out of the chamber 91. Then, the controller 70 closes the shutter 93.

At last, the controller 70 performs recovering process on the vapor dewatering unit 100. After the mixed vapor is dewatered in the vapor dewatering unit 100, each section of the vapor dewatering unit 100 such as the separating section 110 or the absorbing section 120 is exposed to the risk of condensation of the mixed vapor. This results in the risk of the mixed vapor flowing into the substrate processor 90 at a reduced rate or the risk of reduction in dewatering performance at the separating section 110 and the absorbing section 120.

In this regard, in the first preferred embodiment, after the vapor drying process on the substrate W is finished, the controller 70 supplies a nitrogen gas at a dew point of −40° C. and a temperature of 40° C. from the nitrogen gas source (see FIG. 3) through the gas supply pipe 101 to the separating section 110, the absorbing section 120, and the foreign object remover 130. In this way, the mixed vapor condensed in these sections is dried and removed.

Further, the controller 70 opens the valve (not shown in the drawings) interposed in the drainage pipe 102 connected to each of the separating section 110, the absorbing section 120, and the foreign object remover 130 to emit the mixed liquid resulting from condensation in each of these sections of the vapor dewatering unit 100 to the drainage mechanism. Further, the controller 70 emits the nitrogen gas supplied through the gas supply pipe 101.

As a result, the recovering process on the vapor dewatering unit 100 is completed. Then, the controller 70 stops supply of the nitrogen gas from the nitrogen gas source to the gas supply pipe 101 and closes the valve (not shown in the drawings) to stop emission through the drainage pipe 102. In this way, a series of the vapor drying steps is finished.

The aforementioned steps S11 to S14 correspond to the vapor drying steps of the first preferred embodiment.

In the first preferred embodiment, the circulation dewatering step is performed in advance before the vaporization dewatering step to increase an IPA concentration to some extent. Then, the vaporization dewatering step is performed. This can remove water in a tiny amount remaining in the mixed liquid storage 11 while suppressing loss of IPA.

In the first preferred embodiment, both the circulation dewatering step and the vaporization dewatering step are performed. This can remove water in a tiny amount remaining in the mixed liquid storage while restricting time of use of the dewatering part to suppress a maintenance load of the apparatus.

A water concentration in the mixed vapor to the supplied to the substrate W can be reduced as a result of the circulation dewatering step and the vaporization dewatering step. Thus, water of a reduced amount remains on the front surface of the substrate W while the mixed liquid having taken the place of the processing liquid and covering the front surface of the substrate W is removed from the substrate W. This prevents the occurrence of collapse of the pattern on the front surface of the substrate W due to the water in the mixed liquid.

In the first preferred embodiment, the circulation dewatering unit is connected to the mixed liquid storage. After the mixed liquid is stored in the mixed liquid storage, specifically, after the storing step, the circulation dewatering step and the vaporization dewatering step are performed. Thus, water originally contained in the mixed liquid supplied from outside to the mixed liquid storage can be removed. This prevents the occurrence of collapse of the pattern on the front surface of the substrate W due to the water in the mixed liquid.

In the first preferred embodiment, the vapor dewatering unit is connected to the vapor supply pipe and water contained in the mixed vapor generated from the mixed liquid storage is removed through the vapor supply pipe. This can reduce a water concentration further in the mixed vapor to be supplied to the substrate W, thereby suppressing collapse of the pattern on the front surface of the substrate W.

In the first preferred embodiment, the vapor dewatering unit has the gas supply pipe through which a nitrogen gas is supplied to the separating section and the absorbing section. The nitrogen gas of a low dew point and a high temperature is supplied through the gas supply pipe to each section of the vapor dewatering unit. In doing so, the mixed liquid resulting from condensation can be dried or the mixed vapor remaining in these sections can be removed. As a result, a flow rate at a certain level or more and dewatering performance at a certain level or more can always be ensured.

Second Preferred Embodiment

In the first preferred embodiment, a membrane filter is used as the foreign object remover 130 (see FIG. 3). However, the foreign object remover 130 is not limited to a membrane filter in terms of implementing the present invention. Various means of removing a foreign object like a particle from gas are applicable.

Figure 8:
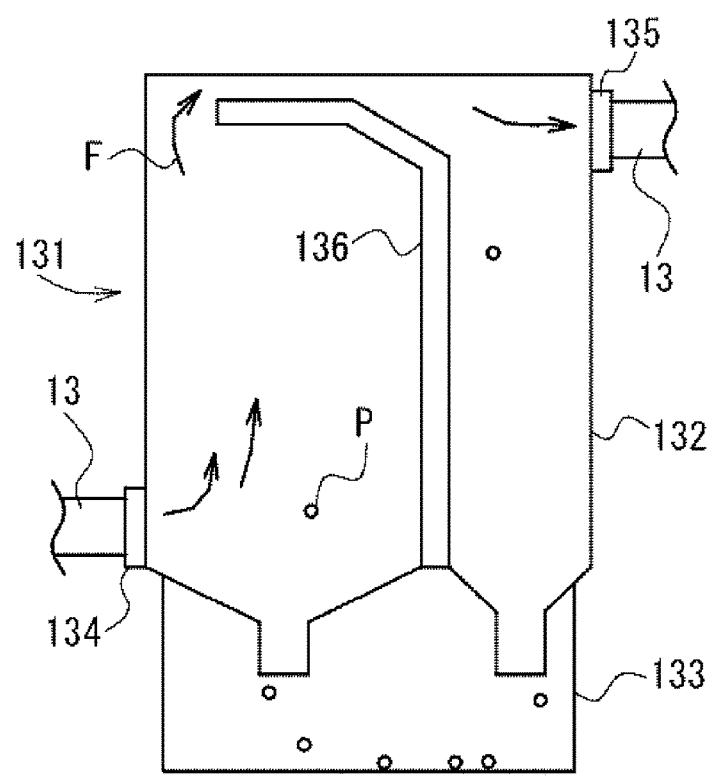
FIG. 8 is a schematic view showing the structure of a foreign object remover according to a second preferred embodiment.

FIG. 8 shows a foreign object remover 131 according to a second preferred embodiment of the present invention. The second preferred embodiment differs from the first preferred embodiment only in that it uses the foreign object remover 131 instead of the foreign object remover 130. The structure of the second preferred embodiment is the same in other respects as that of the first preferred embodiment. Thus, structures other than the foreign object remover 131 will not be described in the description of the second preferred embodiment.

The foreign object remover 131 has a wall part 132 forming space inside and a foreign object collecting part 133. The foreign object remover 131 separates a foreign object P such as a particle from an airflow (flow direction F) by means of gravity. An inlet 134 provided at a lower portion of the wall part 132 is connected to an upstream-side point of the vapor supply pipe 13 (a point closer to the mixed liquid storage 11). An outlet 135 provided at an upper portion of the wall part 132 is connected to a downstream-side point of the vapor supply pipe 13.

The wall part 132 has a barrier 136 inside the wall part 132. The foreign object P such as a particle contained in the introduced mixed vapor is separated from the mixed vapor by means of gravity or by collision with the barrier 136. Then, the separated foreign object P is collected in the foreign object collecting part 133 provided under the wall part 132.

The foreign object P such as a particle separated from the mixed vapor in the space inside the wall part 132 is collected in the foreign object collecting part 133. The foreign object collecting part 133 is provided under the wall part 132 and attached to the wall part 132 in such a manner that the foreign object collecting part 133 can be detached from the wall part 132.

The foreign object remover 131 is not limited to the aforementioned foreign object remover using gravity in terms of implementing the present invention. The foreign object remover 131 may be a foreign object remover employing what is called a cyclone system of separating a particle from gas by means of centrifugal force. Alternatively, the foreign object remover 131 may be a foreign object remover employing an inertial force system of separating the mixed vapor and a foreign object such as a particle by changing the direction of an airflow of the mixed vapor for example using a flow regulating plate. Still alternatively, by employing these multiple systems in combination, a foreign object such as a particle contained in the mixed vapor may be removed by foreign object removers arranged at multiple stages.

3. Modifications

The first preferred embodiment includes the largest number of steps for implementing the present invention. However, in terms of implementing the present invention, the problem for which the present invention is intended can still be solved even if not all the steps shown in the first preferred embodiment are performed.

<3-1. Omission of Circulation Dewatering Step and Vaporization Dewatering Step>

In terms of implementing the present invention, the vapor supplying step may be performed immediately after the storing step without performing the circulation dewatering step and the vaporization dewatering step. Even in this case, water originally contained in the mixed liquid supplied from outside to the mixed liquid storage can still be removed. This prevents the occurrence of collapse of a pattern on the front surface of the substrate W due to the water in the mixed liquid.

A required level of an IPA concentration depends on the scale of a pattern formed on the substrate W to be processed by the substrate processor 90. Even if the mixed liquid stored in the mixed liquid storage 11 does not satisfy the required level of an IPA concentration, the circulation dewatering step and the vaporization dewatering step can be omitted as long as the mixed vapor having an IPA concentration at the required level can be obtained by generating the mixed vapor from the mixed liquid storage 11 using the vapor generator 20, introducing the generated mixed vapor from the vapor supply pipe 13 into the vapor dewatering unit 100, and removing water in this mixed vapor using the vapor dewatering unit 100. In this case, the circulation dewatering unit 30, the exhaust unit 40, and the mixed vapor supply 50 may be omitted from the vapor supplying apparatus 10.

<3-2. Omission of Vaporization Dewatering Step>

In terms of implementing the present invention, the vaporization dewatering step may be omitted. In this case, the circulation dewatering step is performed after the storing step and the vapor supplying step is performed thereafter. A required level of an IPA concentration depends on the scale of a pattern formed on the substrate W to be processed by the substrate processor 90. If collapse of a pattern can be prevented while the concentration of a water content is 10 ppm, the vapor supplying step (S14) may be performed after the circulation dewatering step (S12) without performing the vaporization dewatering step (S13) shown in FIG. 5.

This can remove water remaining in the mixed liquid in the mixed liquid storage 11 without loss of IPA to be caused in the vaporization dewatering step, so that collapse of a pattern can be prevented in the vapor drying process on the substrate W.

<3-3. Omission of Supply of Mixed Vapor from Mixed Vapor Storage in Vaporization Dewatering Step>

Supply of the mixed vapor from the mixed vapor storage 52 to the mixed liquid storage 11 in the vaporization dewatering step is not absolutely necessary in terms of implementing the present invention. The mixed liquid may be vaporized by being heated with the heater 22 in the absence of such supply of the mixed vapor.

This makes it unnecessary to prepare the mixed vapor storage 52, thereby suppressing cost increase or size increase of the apparatus.

<3-4. Ultrasonic Generator>

In the first preferred embodiment, the vapor generator 20 includes the heater 22. However, this is not the only structure of the vapor generator 20 in terms of implementing the present invention. The vapor generator 20 may include an ultrasonic generator that ultrasonically vibrates the mixed liquid stored in the mixed liquid storage 11 instead of or in addition to the heater 22. The ultrasonic generator is electrically connected to the controller 70 and ultrasonically vibrates the mixed liquid in response to an operational command from the controller 70.

The ultrasonic vibration atomizes the surface of the mixed liquid. By supplying a nitrogen gas from the nitrogen gas source to the mixed liquid storage 11 in this state, the atomized mixed liquid can be mixed into the nitrogen gas. The atomized mixed liquid is increased in surface area, so that it is vaporized in the nitrogen gas. In this way, the mixed vapor containing vapor of the mixed liquid is generated.

By using the ultrasonic generator instead of the heater 22 as described above, the resultant mixed vapor can be maintained at ordinary temperatures. If the mixed vapor is obtained by heating the mixed liquid to a temperature from about 50 to about 60° C. using the heater 22 and then performing bubbling, the resultant mixed vapor at a temperature higher than ordinary temperatures is cooled to ordinary temperatures in the vapor supply pipe 13. This causes the risk of condensation into the mixed liquid in the vapor supply pipe 13. The first preferred embodiment involves provision of the temperature controlling mechanism in the vapor supply pipe 13 with the intension of avoiding this risk. However, by using the ultrasonic generator instead of the heater 22, the mixed vapor can be generated without heating the mixed liquid. This does not cause the risk of condensation into the mixed liquid due to cooling of the mixed vapor from a high temperature to ordinary temperatures. As a result, cost relating to a component to be prepared against the condensation can be avoided and the apparatus can be simplified.

<3-5. Concentration of IPA Vapor in Mixed Vapor>

In the first preferred embodiment, a membrane filter is used as the foreign object remover 130 in the vapor dewatering unit 100. If the mixed vapor containing IPA vapor, water vapor, and a nitrogen gas is configured to pass through the filter, the IPA vapor or the water vapor forming the mixed vapor and likely to be condensed is captured with the filter as the mixed vapor passes through the filter. This might reduce the amount of IPA vapor that can be supplied to the substrate W per unit time.

In response to the aforementioned reduction in the amount of IPA vapor contained in the mixed vapor caused by passing of the mixed vapor through the foreign object remover 130, the mixed vapor containing IPA vapor of a concentration higher than a desired level may be generated in advance in the mixed liquid storage 11 in order to supply an intended amount of IPA vapor to the substrate W.

More specifically, a temperature of heating of the mixed liquid by the heater 22 may be increased or the flow rate of a nitrogen gas supplied from the nitrogen gas source in the vapor generator 20 may be reduced. In doing so, an IPA vapor concentration in the mixed vapor can be increased further.

<3-6. Exchange of Vapor Dewatering Unit>

In the first preferred embodiment, each of the separating section 110 and the absorbing section 120 of the vapor dewatering unit 100 may be connected through a joint to the vapor supply pipe 13 in such a manner that each of the separating section 110 and the absorbing section 120 can be detached from the vapor supply pipe 13. In this way, these sections may be configured as exchangeable sections.

For visualization of time of exchange of the separating section 110 and the absorbing section 120, water concentration sensors may be interposed in the vapor supply pipe 13 in a position between the separating section 110 and the absorbing section 120 and a position between the absorbing section 120 and the foreign object remover 130.

While the invention has been described in detail, the foregoing description is in all aspects illustrative and not restrictive. It is understood that numerous other modifications and variations can be devised without departing from the scope of the invention.

What is claimed is:

1. A vapor supplying apparatus used for vapor drying process of supplying vapor of a low surface tension liquid to a main surface of a substrate to which a processing liquid adheres, said low surface tension liquid having surface tension same as or lower than that of said processing liquid, said vapor supplying apparatus comprising:
   a mixed liquid storage that stores a mixed liquid containing said low surface tension liquid and water;
   a vapor generator that generates mixed vapor as vapor of said mixed liquid from said mixed liquid stored in said mixed liquid storage;
   a vapor supply pipe connected to said mixed liquid storage and through which mixed vapor generated by said vapor generator is supplied to said substrate; and
   a vapor dewatering unit interposed in said vapor supply pipe, said vapor dewatering unit removing water from said mixed vapor passing through said vapor supply pipe
   wherein in said vapor dewatering unit, said mixed vapor passes through a separating section and an absorbing section, such that water is separated from said mixed vapor and the separated water is absorbed.

2. The vapor supplying apparatus according to claim 1, wherein
   said vapor dewatering unit includes a gas supply that supplies a nitrogen gas to at least one of said separating section and said absorbing section.

3. The vapor supplying apparatus according to claim 1, wherein
   said vapor dewatering unit includes a drainage pipe connected to at least one of said separating section and said absorbing section, and
   said mixed liquid generated resulting from condensation of said mixed vapor in at least one of said separating section and said absorbing section is emitted through said drainage pipe.

4. The vapor supplying apparatus according to claim 1, wherein
   in said vapor dewatering unit, said separating section and said absorbing section are attached to said vapor supply pipe in such a manner that said separating section and said absorbing section can be detached from said vapor supply pipe.

5. The vapor supplying apparatus according to claim 1, further comprising
   a mixed liquid supply that supplies said mixed liquid to said mixed liquid storage,
   wherein said mixed liquid supply supplies said mixed liquid containing water of a ratio of 0.1% by weight or less to said mixed liquid storage.

6. The vapor supplying apparatus according to claim 1, further comprising:
   a circulation dewatering unit that introduces said mixed liquid stored in said mixed liquid storage into said circulation dewatering unit, dewaters said mixed liquid, and returns said mixed liquid after being dewatered to said mixed liquid storage; and
   an exhaust unit that emits said mixed vapor generated by said vapor generator to an exhaust mechanism outside said mixed liquid storage.

7. The vapor supplying apparatus according to claim 6, further comprising
   a mixed vapor supply that supplies said mixed vapor to said mixed liquid storage,
   wherein the humidity of said low surface tension liquid in said mixed vapor supplied by said mixed vapor supply to said mixed liquid storage is higher than the humidity of water in said mixed vapor supplied by said mixed vapor supply to said mixed liquid storage.

8. The vapor supplying apparatus according to claim 7, wherein
   said mixed vapor supply includes a mixed vapor storage that stores said mixed vapor,
   said mixed vapor storage is connected to said vapor supply pipe, and
   said mixed vapor generated by said vapor generator is supplied through said vapor supply pipe to at least one of said substrate and said mixed vapor storage.

9. The vapor supplying apparatus according to claim 6, further comprising:

a sensor that senses the concentration of said low surface tension liquid or that of water contained in said mixed liquid stored in said mixed liquid storage; and a controller that controls said vapor generator and said exhaust unit based on said concentration sensed by said sensor, wherein if a water concentration in said mixed liquid stored in said mixed liquid storage is a first designated value or less and larger than a second designated value, said controller makes said vapor generator generate said mixed vapor from said mixed liquid stored in said mixed liquid storage and makes said exhaust unit emit said mixed vapor to said exhaust mechanism, if a water concentration in said mixed liquid stored in said mixed liquid storage is said second designated value or less, said controller makes said vapor generator generate said mixed vapor from said mixed liquid stored in said mixed liquid storage and supplies said mixed vapor to said vapor supply pipe, said first designated value is a value not exceeding a water concentration while the concentration of said low surface tension liquid is an azeotropic concentration, said azeotropic concentration being a concentration at which the concentration of said low surface tension liquid contained in said mixed liquid and the concentration of vapor of said low surface tension liquid contained in said mixed vapor generated from said mixed liquid are the same, and said second designated value is smaller than said first designated value.

10. The vapor supplying apparatus according to claim 9, further comprising a pipe for outflow through which said mixed liquid stored in said mixed liquid storage flows outwardly, wherein said sensor senses the concentration of said low surface tension liquid or that of water contained in said mixed liquid using said mixed liquid flowing outwardly from said pipe for outflow.

11. A vapor drying apparatus comprising:
a vapor supplying apparatus;
a chamber that houses a substrate; and
a nozzle from which mixed vapor is supplied to said substrate housed in said chamber, said nozzle being communicatively connected to a vapor supply pipe,
wherein said vapor supplying apparatus includes:
a mixed liquid storage that stores a mixed liquid containing a low surface tension liquid and water;
a vapor generator that generates said mixed vapor as vapor of said mixed liquid from said mixed liquid stored in said mixed liquid storage;
said vapor supply pipe connected to said mixed liquid storage and through which said mixed vapor generated by said vapor generator is supplied to said substrate; and
a vapor dewatering unit interposed in said vapor supply pipe, said vapor dewatering unit removing water from said mixed vapor passing through said vapor supply pipe
wherein in said vapor dewatering unit, said mixed vapor passes through a separating section and an absorbing section, such that water is separated from said mixed vapor and the separated water is absorbed.

12. A vapor supplying method used for vapor drying process of supplying vapor of a low surface tension liquid to a main surface of a substrate to which a processing liquid adheres, said low surface tension liquid having surface tension same as or lower than that of said processing liquid, said vapor supplying method comprising the steps of:
a) supplying a mixed liquid containing said low surface tension liquid and water to a mixed liquid storage that stores said mixed liquid; and
b) generating mixed vapor as vapor of said mixed liquid from said mixed liquid stored in said mixed liquid storage and supplying said mixed vapor to a vapor supply pipe connected to said mixed liquid storage and through which said mixed vapor is supplied to said substrate,
wherein said step b) includes the step of:
b1) removing water from said mixed vapor supplied to said vapor supply pipe by passing said mixed vapor through a vapor dewatering unit, wherein
said vapor dewatering unit includes a separating section and an absorbing section,
said separating section separates water from said mixed vapor, and
said absorbing section absorbs water in said mixed vapor.

13. The vapor supplying method according to claim 12, further comprising the steps of:
c) introducing said mixed liquid stored in said mixed liquid storage into a circulation dewatering unit communicatively connected to said mixed liquid storage, dewatering said mixed liquid in said circulation dewatering unit, and returning said mixed liquid after being dewatered from said circulation dewatering unit to said mixed liquid storage; and
d) after a water concentration in said mixed liquid stored in said mixed liquid storage becomes a first designated value or less and larger than a second designated value as a result of said step c), generating said mixed vapor from said mixed liquid stored in said mixed liquid storage and emitting said mixed vapor to an exhaust mechanism outside said mixed liquid storage, wherein
in said step a), said mixed liquid containing water having a ratio of 0.1% by weight or less and having a concentration larger than said first designated value is supplied to said mixed liquid storage,
in said step b), after a water concentration in said mixed liquid becomes said second designated value or less as a result of said step d), said mixed vapor is generated from said mixed liquid stored in said mixed liquid and said mixed vapor is supplied to said vapor supply pipe,
said first designated value is a value not exceeding a water concentration while the concentration of said low surface tension liquid is an azeotropic concentration, said azeotropic concentration being a concentration at which the concentration of said low surface tension liquid contained in said mixed liquid and the concentration of vapor of said low surface tension liquid contained in said mixed vapor generated from said mixed liquid are the same, and
said second designated value is smaller than said first designated value.

14. A vapor drying method of supplying vapor of a low surface tension liquid to a main surface of a substrate to which a processing liquid adheres, said low surface tension liquid having surface tension same as or lower than that of said processing liquid, said vapor drying method comprising the steps of:
e) supplying a mixed liquid containing said low surface tension liquid and water to a mixed liquid storage that stores said mixed liquid; and
f) generating mixed vapor as vapor of said mixed liquid from said mixed liquid stored in said mixed liquid storage and supplying said mixed vapor through a vapor supply pipe connected to said mixed liquid storage to said main surface of said substrate to which said processing liquid adheres,
wherein said step f) includes the step of:
f1) removing water from said mixed vapor supplied to said vapor supply pipe by passing said mixed vapor through a vapor dewatering unit, wherein
said vapor dewatering unit includes a separating section and an absorbing section,
said separating section separates water from said mixed vapor, and
said absorbing section absorbs water in said mixed vapor.

* * * * *